United States Patent
Hylton et al.

(10) Patent No.: US 9,169,579 B2
(45) Date of Patent: Oct. 27, 2015

(54) CARBON NANOTUBE MEDIATED MEMBRANE EXTRACTION

(75) Inventors: Kamilah Hylton, Ensom (JM);
Somenath Mitra, Bridgewater, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 508 days.

(21) Appl. No.: 12/437,789

(22) Filed: May 8, 2009

(65) Prior Publication Data
US 2009/0283475 A1   Nov. 19, 2009

Related U.S. Application Data

(63) Continuation-in-part of application No. 11/374,499, filed on Mar. 13, 2006, now Pat. No. 7,754,054.

(60) Provisional application No. 61/051,877, filed on May 9, 2008, provisional application No. 60/660,802, filed on Mar. 11, 2005.

(51) Int. Cl.
*B01D 61/36* (2006.01)
*B01D 71/02* (2006.01)
(Continued)

(52) U.S. Cl.
CPC ............ *D01F 11/10* (2013.01); *B01D 67/0079* (2013.01); *B01D 69/141* (2013.01);
(Continued)

(58) Field of Classification Search
CPC ............ B01D 67/0044; B01D 67/009; B01D 67/0093; B01D 67/0079; B01D 69/141; B01D 69/148; B01D 71/021; B01D 71/82; B01D 61/00; B01D 61/36; B01D 53/22; B01D 53/223; B01D 71/02; C01B 31/02; C01B 31/022; C01B 31/0226; C01B 31/0253; C01B 31/0273; D06M 11/74; D06M 15/256; D06M 23/08; D06M 11/73; D01F 11/10; D01F 11/16; B32B 5/16; B82Y 30/00; B82Y 40/00; Y10T 428/25
USPC ............... 204/157.15, 157.43, 157.47, 157.6; 210/500.21, 500.22, 500.23, 640, 644, 210/650; 96/4, 8–10; 95/45; 423/460, 461; 264/45.1, 405; 427/226, 241.1, 385.5; 428/36.9, 323; 977/745, 748, 845, 847; 422/186

See application file for complete search history.

(56) References Cited

U.S. PATENT DOCUMENTS 5,266,207 A * 11/1993 Boye et al. .................... 210/653
7,148,269 B2 * 12/2006 Winey et al. .................. 523/218
(Continued)

OTHER PUBLICATIONS

NPL Publication: "Controlled Microwave Heating in Modern Organic Synthesis", C. Oliver Kappe, Angewandte Chemie International Edition, vol. 43, Issue 46, pp. 6250-6284, published online Nov. 23, 2004.*
(Continued)

*Primary Examiner* — Joseph Drodge
(74) *Attorney, Agent, or Firm* — McCarter & English, LLP

(57) ABSTRACT

The present disclosure provides an improved membrane or substrate having carbon nanotubes introduced and/or immobilized therein, and an improved method for introducing and/or immobilizing carbon nanotubes in membranes or substrates. More particularly, the present disclosure provides for improved systems and methods for fabricating membranes or substrates having carbon nanotubes immobilized therein. In one embodiment, the present disclosure provides for systems and methods for introducing and/or immobilizing functionalized carbon nanotubes into the pore structure of a polymeric membrane or substrate, thereby dramatically improving the performance of the polymeric membrane or substrate. In exemplary embodiments, the present disclosure provides for systems and methods for the fabrication of nanotube immobilized membranes by incorporating CNTs in a membrane or substrate.

18 Claims, 18 Drawing Sheets

(51) Int. Cl.

| | | |
|---|---|---|
| B01D 53/22 | (2006.01) | |
| B32B 5/16 | (2006.01) | |
| B05D 3/06 | (2006.01) | |
| B05D 3/10 | (2006.01) | |
| D06M 11/73 | (2006.01) | |
| D01F 11/10 | (2006.01) | |
| B01D 67/00 | (2006.01) | |
| B01D 69/14 | (2006.01) | |
| B01D 71/82 | (2006.01) | |
| B82Y 30/00 | (2011.01) | |
| D01F 11/16 | (2006.01) | |
| D06M 11/74 | (2006.01) | |
| D06M 15/256 | (2006.01) | |
| D06M 23/08 | (2006.01) | |

(52) U.S. Cl.
CPC ............ *B01D69/148* (2013.01); *B01D 71/021* (2013.01); *B01D 71/82* (2013.01); *B82Y 30/00* (2013.01); *D01F 11/16* (2013.01); *D06M 11/74* (2013.01); *D06M 15/256* (2013.01); *D06M 23/08* (2013.01); *Y10T 428/25* (2015.01)

(56) References Cited

U.S. PATENT DOCUMENTS

| | | | | |
|---|---|---|---|---|
| 7,211,320 | B1 * | 5/2007 | Cooper et al. | 428/306.6 |
| 7,244,407 | B2 * | 7/2007 | Chen et al. | 423/445 B |
| 7,365,100 | B2 * | 4/2008 | Kuper et al. | 516/32 |
| 7,419,601 | B2 * | 9/2008 | Cooper et al. | 210/679 |
| 7,611,628 | B1 * | 11/2009 | Hinds, III | 210/500.27 |
| 7,754,054 | B2 | 7/2010 | Mitra et al. | |
| 2004/0222080 | A1 * | 11/2004 | Tour et al. | 204/157.15 |
| 2004/0222081 | A1 * | 11/2004 | Tour et al. | 204/157.15 |
| 2005/0186378 | A1 | 8/2005 | Bhatt | |
| 2005/0263456 | A1 * | 12/2005 | Cooper et al. | 210/660 |
| 2006/0171874 | A1 * | 8/2006 | Khabashesku et al. | 423/445 B |
| 2007/0120095 | A1 * | 5/2007 | Gruner | 252/500 |
| 2009/0283475 | A1 | 11/2009 | Hylton et al. | |
| 2010/0143401 | A1 * | 6/2010 | Wang et al. | 424/198.1 |

OTHER PUBLICATIONS

Abstract of NPL Publication: "Microwave-assisted synthesis of a soluble single wall carbon nanotube derivative", FD Negra, Taylor & Francis, vol. 11, Issue 1, published 2003.*

Delgado et al., Microwave-Assisted Sidewall Functionalization of Single-Wall Carbon Nanotubes by Diela-Alder Cycloaddition, Chemical Communications, No. 15, pp. 1734-1735, 2004.

Tasis, et al., Soluble Carbon Nanotubes, Chem. Eur. J., vol. 9, pp. 4000-4008, especially pp. 4002-4005, 2003.

Holzinger et al., Sidewall Functionalization of Carbon Nanotubes, Angew. Chem. Int. Ed. vol. 40, No. 21, pp. 4002-4005, especially p. 4003, 2001.

Wang, X. et al., Contact-Damage-Resistant Ceramic/Single-Wall Carbon Nanotubes and Ceramic/Graphite Composites, Nature Materials, vol. 3, pp. 539,544, Aug. 2004.

Guo, T., et al., Catalytic Growth of Single-Walled Nanotubes by Laser Vaporization, Chemical Physics Letter 243, pp. 49-54, 1995.

Eklund, et al., Large-Scale Production of Single-Walled Carbon Nanotubes Using Ultrafast Pulses from a Free Electron Laser, American Chemical Society, pp. 561-566, 2002.

Nikolaev, et al., Gas-Phase Catalytic Growth of Single-Walled Carbon Nanotubes from Carbon Monoxide, Chemical Physics Letters 313, pp. 91-97, 1999.

Journet, et al., Large-Scale Production of Single-Walled Carbon Nanotubes by the Electric-Arc Technique, Nature, vol. 388, pp. 756-758, 1997.

Wang, et al., The Large-Scale Production of Carbon Nanotubes in a Nano-Agglomerate Fluidized-Bed Reactor, Chemical Physics Letters 364, pp. 568-572, 2002.

Kato, et al., Structure Control of Carbon Nanotubes Using Radio-Frequency Plasma Enhanced Chemical Vapor Deposition, Thin Solid Films 457, pp. 2-6, 2004.

Lyu, et al., Large-Scale Synthesis of High-Quality Single-Walled Carbon Nanotubes by Catalytic Decomposition of Ethylene, J. Phys. Chem B 108, pp. 1613-1616, 2004.

Kuzmany, et al., Functionalization of Carbon Nanotubes, Synthetic Metals 141, pp. 113-122, 2004.

Loupy, Solvent-Free Microwave Organic Synthesis as an Efficient Procedure for Green Chemistry, Chimie 7, pp. 103-112, 2004.

Kamalakaran, et al., Microstructural Characterization of C—SiC—Carbon Nanotube Composite Flakes, Carbon 42, pp. 1-4, 2004.

Lewis, et al., Accelerated Imidization Reactions Using Microwave Radiation, Journal of Polymer Science: Part A: Polymer Chemistry, vol. 30, pp. 1647-1653, 1992.

Gedye, et al., The Use of Microwave Ovens for Rapid Organic Synthesis, Tetrahedron Letters, vol. 27, No. 3, pp. 279-282, 1986.

Giguere, et al., Application of Commercial Microwave Ovens to Organic Synthesis, Tetrahedron Letters, vol. 27, No. 41, pp. 4945-4948, 1986.

* cited by examiner (A)  (B)

CARBON NANOTUBE MEDIATED MEMBRANE EXTRACTION

CROSS REFERENCE TO RELATED APPLICATIONS

This application claims the benefit of U.S. Provisional Application No. 61/051,877 filed May 9, 2008, all of which is herein incorporated by reference in its entirety; and claims priority to and is a continuation-in-part of U.S. patent application Ser. No. 11/374,499 filed Mar. 13, 2006, now U.S. Pat. No. 7,754,054, which claims priority to Provisional App. Ser. No. 60/660,802 filed Mar. 11, 2005, all of which is also herein incorporated by reference in its entirety.

BACKGROUND

1. Technical Field

The present disclosure relates to nanomaterial technology and, more particularly, to a membrane or substrate having carbon nanotubes introduced and/or immobilized therein and method for introducing and/or immobilizing carbon nanotubes in membranes or substrates.

2. Background Art

In general, membranes are permeable structures that facilitate the separation of solutes based on size and/or physical and chemical properties. Typical synthetic membranes may be fabricated from a variety of materials, such as, for example, metallic, ceramic or polymeric materials. Over the past few decades, membrane technology has generally made strides by developing materials that allow greater flux and selectivity (Ref. 1). In general, flux is associated with the high permeability of the solutes, and the selectivity is associated with the preferential elimination of interfering species. Typical membranes represent a compromise between these two factors (e.g., membranes with high selectivity tend to have lower permeability and vice versa).

Assessments of permeability and selectivity have generally shown asymptotic limitations on the separation capability of substantially pure polymeric membranes (Refs. 2, 3). Consequently, the development of novel membrane systems is of great importance. One approach has been the development of mixed matrix membranes ("MMMs"), which typically combine polymeric materials with inorganic fillers such as, for example, zeolites (Refs. 4, 5). In general, these MMMs have exhibited greater permeation rates and selectivity in gas separation (Refs. 6-8), higher flux in pervaporation (Refs. 9, 10), enzyme concentration (Ref. 11) and protein separation (Ref. 12). Typical fabrication processes for MMMs involve adding the filler material to the polymer solution followed by film casting or spinning (Refs. 4, 5, 13). In general, these processes are complex, time consuming, require strong interactions between the polymer and the inorganic filler, and they coat the particle with the polymer (Refs. 5, 14-16).

In general, carbon nanotubes ("CNTs") typically are graphene sheets rolled into tubes as single-walled nanotube (SWNT) or multiple-walled nanotube (MWNT) structures. CNTs can be utilized for membrane systems. There has been interest in CNTs because of their desired thermal, electrical and structural properties (Ref. 17). Some studies have investigated their interaction with organic molecules, and have demonstrated sorbent properties that in some cases are superior to conventional materials such as, for example, $C_{18}$ and $C_8$ (Refs. 18-20). It has also been reported that self-assembled nanotubes are highly effective as high resolution gas chromatography stationary phases (Refs. 21-24). CNTs have been deposited on ceramic matrices via chemical vapor deposition to form membranes that exhibit high permeation rates (Ref. 25), and aligned MWNTs have facilitated the flow of small organic molecules (Ref. 6). In addition, theoretical studies have suggested that permeabilities of certain liquids and gases through carbon nanotubes far exceed what is expected from classical diffusion models (Refs. 25-28). This enhancement has been attributed to the generally smooth CNT surface, substantially frictionless rapid transport, and molecular ordering (Ref. 27).

In addition to being generally effective transporters (Refs. 25-28), CNTs are typically also effective sorbents, particularly for organics (Refs. 22-24). Together these two properties may increase the selective partitioning and permeation of the solute of interest. In typical membrane-based liquid extractions, when the two phases contact at the pores, the interactions can take place via rapid solute exchange on the CNTs, thus increasing the effective rate of mass transfer and flux. The high aspect ratio of the CNTs increases the active surface area as well, which may contribute to an increase in flux.

In general, incorporating CNTs in a membrane and/or membrane system is very challenging (e.g., without covering the active surface of the CNTs with the polymer). For example, in polymer coated CNTs, the encapsulating film serves as an additional barrier to mass transfer. Thus, despite efforts to date, a need remains for cost-effective, efficient systems and methods for producing membranes or materials having carbon nanotubes introduced and/or immobilized therein, and improved methods for introducing and/or immobilizing carbon nanotubes in membranes or materials (e.g., polymeric membranes). These and other inefficiencies and opportunities for improvement are addressed and/or overcome by the systems and methods of the present disclosure.

SUMMARY

The present disclosure provides advantageous membranes or materials having carbon nanotubes ("CNTs") introduced and/or immobilized therein, and improved methods for introducing and/or immobilizing CNTs in membranes or substrates. For example, the present disclosure provides for methods to immobilize CNTs in the membrane or substrate pores, without substantially encapsulating the CNTs in a polymer or film so that the surface of the CNTs remains substantially free and/or available for active solute transport or exchange. In exemplary embodiments, the present disclosure provides for improved systems and methods for fabricating porous polymeric membranes or porous substrates having CNTs immobilized therein. In one embodiment, the present disclosure provides for systems and methods for introducing and/or immobilizing functionalized CNTs into the pore structure of a polymeric membrane or material, thereby dramatically improving the performance of the polymeric membrane or material. In exemplary embodiments, the present disclosure provides for systems and methods for the fabrication of nanotube immobilized membranes ("NIMs") by incorporating CNTs in a membrane or membrane substrate. For example, the fabricated NIMs may be utilized for liquid phase extraction or the like.

The present disclosure provides for a method for fabricating a nanotube immobilized membrane (NIM) including providing a substrate; introducing a plurality of carbon nanotubes into the substrate; wherein after the plurality of carbon nanotubes is introduced into the substrate, at least one of the plurality of carbon nanotubes is substantially immobilized within the substrate.

The present disclosure also provides for a method for fabricating a NIM wherein prior to introduction into the substrate, the plurality of carbon nanotubes takes the form of a dispersion of carbon nanotubes; and wherein the dispersion is selected from the group consisting of aqueous, non-aqueous, polymeric and monomeric dispersions. The present disclosure also provides for a method for fabricating a NIM wherein prior to dispersion, the plurality of carbon nanotubes are functionalized. The present disclosure also provides for a method for fabricating a NIM wherein the plurality of carbon nanotubes are covalently functionalized via a microwave process. The present disclosure also provides for a method for fabricating a NIM wherein at least one of the carbon nanotubes contains the functional group selected from the group consisting of —COOH, —NO$_2$, amides, —HSO$_3$, polymers and biomolecules.

The present disclosure also provides for a method for fabricating a NIM wherein the substrate is selected from the group consisting of polymeric, ceramic, metallic, porous, non-porous, composite, symmetric and asymmetric substrates. The present disclosure also provides for a method for fabricating a NIM wherein the surface of the at least one immobilized carbon nanotube is substantially available for active solute transport or exchange. The present disclosure also provides for a method for fabricating a NIM wherein the plurality of carbon nanotubes includes single wall carbon nanotubes (SWNTs) and multiwall carbon nanotubes (MWNTs). The present disclosure also provides for a method for fabricating a NIM wherein the plurality of carbon nanotubes is injected or pumped into the substrate under pressure.

The present disclosure also provides for a method for fabricating a NIM further including the step of utilizing the substrate with the at least one immobilized carbon nanotube in a separation process. The present disclosure also provides for a method for fabricating a NIM wherein the separation process is selected from the group consisting of membrane distillation, membrane based extraction, supported liquid membrane extraction, pervaporation, desalination, gas separation and liquid-liquid membrane extraction.

The present disclosure also provides for a method for fabricating a NIM including providing a substrate; dispersing a plurality of carbon nanotubes in a monomer or polymer solution to form a dispersion; introducing the dispersion into the substrate; polymerizing the dispersion; wherein after the dispersion is introduced into the substrate and polymerized, at least one of the plurality of carbon nanotubes is substantially immobilized within the substrate. The present disclosure also provides for a method for fabricating a NIM wherein prior to forming the dispersion, the plurality of carbon nanotubes are functionalized. The present disclosure also provides for a method for fabricating a NIM wherein the plurality of carbon nanotubes are covalently functionalized via a microwave process. The present disclosure also provides for a method for fabricating a NIM wherein at least one of the carbon nanotubes contains the functional group selected from the group consisting of —COOH, —NO$_2$, amides, —HSO$_3$, polymers and biomolecules. The present disclosure also provides for a method for fabricating a NIM wherein the substrate is selected from the group consisting of polymeric, ceramic, metallic, porous, non-porous, composite, symmetric and asymmetric substrates.

The present disclosure also provides for a method for fabricating a NIM wherein the surface of the at least one immobilized carbon nanotube is substantially available for active solute transport or exchange. The present disclosure also provides for a method for fabricating a NIM wherein the plurality of carbon nanotubes includes single wall carbon nanotubes (SWNTs) and multiwall carbon nanotubes (MWNTs). The present disclosure also provides for a method for fabricating a NIM wherein the dispersion is injected or pumped into the substrate under pressure. The present disclosure also provides for a method for fabricating a NIM wherein the solution is selected from the group consisting of polyvinylidene fluoride (PVDF), methyl methacrylate, polyvinyl pyrrolidone, polyurethane, polyamide, polyethylene and polyethylene glycol solutions.

The present disclosure also provides for a method for fabricating a NIM including providing a substrate; dispersing a plurality of functionalized carbon nanotubes in a dispersion; introducing the dispersion into the substrate; wherein after the dispersion is introduced into the substrate, at least one of the plurality of carbon nanotubes is substantially immobilized within the substrate; and wherein the surface of the at least one immobilized carbon nanotube is substantially available for active solute transport or exchange. The present disclosure also provides for a method for fabricating a NIM wherein the plurality of carbon nanotubes are covalently functionalized via a microwave process.

Additional advantageous features, functions and applications of the disclosed systems and methods of the present disclosure will be apparent from the description which follows, particularly when read in conjunction with the appended figures.

BRIEF DESCRIPTION OF THE DRAWINGS

To assist those of ordinary skill in the art in making and using the disclosed systems and methods, reference is made to the appended figures, wherein.

DETAILED DESCRIPTION

Figure 1:
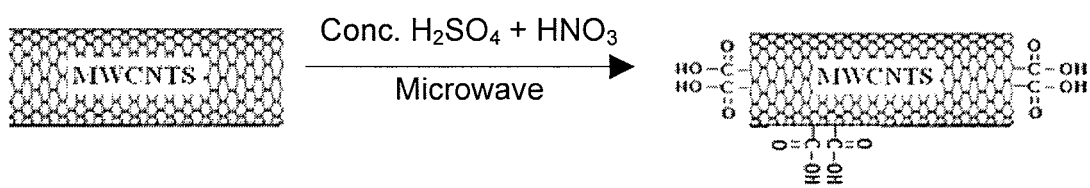
FIG. 1 illustrates the reaction equation for acid functionalization of CNTs according to the present disclosure.

In the description which follows, like parts are marked throughout the specification and drawings with the same reference numerals, respectively. Drawing figures are not necessarily to scale and in certain views, parts may have been exaggerated for purposes of clarity.

The present disclosure provides an improved membrane or substrate having carbon nanotubes (CNTs) introduced and/or immobilized therein, and an improved method for introducing and/or immobilizing carbon nanotubes in membranes or substrates (e.g., porous polymeric membranes or porous substrates). More particularly, the present disclosure provides for improved systems and methods for fabricating membranes (e.g., polymeric membranes) or substrates having carbon nanotubes immobilized therein. In an exemplary embodiment, the present disclosure provides for systems and methods for introducing and/or immobilizing functionalized carbon nanotubes into the pore structure of a polymeric membrane or substrate, thereby dramatically improving the performance of the polymeric membrane or substrate. In general, the present disclosure provides for systems and methods for the fabrication of nanotube immobilized membranes ("NIMs") by incorporating or immobilizing CNTs (e.g., functionalized CNTs) in a substrate (e.g., a porous polymeric membrane substrate). For example, a NIM may be fabricated by percolating and/or injecting a CNT dispersion through a membrane or substrate (e.g., a porous polymeric membrane or a porous substrate). For example, the fabricated NIMs may be utilized for liquid phase extraction or the like. In general, the present disclosure provides for methods to immobilize CNTs in the membrane or substrate pores, without substantially encapsulating the CNTs in a polymer or film so that the surface of the CNTs remains substantially free and/or available for active solute transport or exchange.

In exemplary embodiments, fabricated NIMs may be used in a variety of processes and/or methods, including, without limitation, membrane distillation, membrane based extraction, supported liquid membrane extraction, pervaporation, desalination, gas separation and liquid-liquid membrane extraction. Additionally, the fabricated NIM may be used for the separation of metals, volatile organics, semivolatile organics, ions, gases, etc. The NIMs may be fabricated on a variety of substrates or materials, including, without limitation, polymeric, ceramic, metallic, porous, non-porous, composite, symmetric and/or asymmetric substrates or materials, or any other suitable substrates or materials.

Current practice provides that typical fabrication processes for mixed matrix membranes ("MMMs") are complex, time consuming, require strong interactions between the polymer and the filler, and they coat the particle or filler with the polymer. Current practice also provides that incorporating CNTs in a membrane and/or membrane system without covering the active surface of the CNTs is very challenging (e.g., the polymer or encapsulating film serves as an additional barrier to mass transfer). In exemplary embodiments, the present disclosure provides for improved methods for introducing and/or immobilizing carbon nanotubes in membranes or materials without encapsulating the CNTs in a polymer or film so that the surface of the immobilized and/or incorporated CNTs remains substantially free and/or available for active solute transport or exchange, thereby providing a significant commercial and manufacturing advantage as a result.

In addition, incorporating CNTs in a membrane system may offer several advantages during membrane extraction, which generally relies upon the solute first partitioning into the membrane at the donor/membrane interface. Typically, this activated process is followed by diffusion under a concentration gradient. In general, permeation across a membrane is described by Fick's law of diffusion which may be expressed as:

$$J = PA\frac{\delta C}{\delta x}$$

where J is the total flux, P is the permeability, A is the surface area, δC is the concentration gradient and δx is the diffusion distance. Permeability is generally dependent on thermodynamics and kinetics of membrane/solute interactions, and can be expressed as:

P=DS where S is the solubility or partition coefficient in the membrane and D is diffusivity. Thus, under the same concentration gradient, higher flux may be achieved by increasing the effective surface area, diffusion and partition coefficients, and also by reducing membrane thickness. Moreover, selectivity may be enhanced by increasing the partition coefficient of the solute and reducing the diffusion coefficient of the interferences.

Immobilization and/or incorporation of a liquid within the pores of a membrane is typically achieved by soaking the membrane in the desired liquid, and the liquid is then typically held within the micro-structure by capillary forces. This is typically used in supported liquid membrane extraction (Ref. 29). Accomplishing the same using CNTs is highly desirable so that their surface is substantially free to interact directly with the solute.

The present disclosure will be further described with respect to the following examples; however, the scope of the disclosure is not limited thereby. The following examples illustrate improved systems and methods for fabricating or producing membranes or materials having carbon nanotubes introduced and/or immobilized therein, and improved systems and methods for introducing and/or immobilizing carbon nanotubes in membranes or materials (e.g., polymeric membranes). As illustrated in the below examples, the present disclosure illustrates that CNTs (e.g., functionalized CNTs) may be readily immobilized into the pore structure of a polymeric membrane, which can dramatically improve the performance of the membrane or NIM ("nanotube immobilized membrane"). In exemplary embodiments, this was accomplished by injecting or introducing an aqueous dispersion of the CNTs through a polypropylene hollow fiber under pressure. The CNTs were trapped and held within the pores, and served as sorbents facilitating solute exchange from the donor to the acceptor phase. The effectiveness of the exemplary CNT mediated process was then studied by micro-scale membrane extraction via direct solvent enrichment of non-polar organics, and also by selective extraction of organic acids via a supported liquid membrane. In both cases, the enrichment factor (measured as the ratio of concentrations in the acceptor to the donor phases) could be increased by more than 200%.

Example 1

Dispersible CNTs were synthesized via covalent functionalization using an exemplary rapid microwave process (Refs. 30-31). For example, CNTs containing —COOH, —$NO_2$ and —$HSO_3$ were synthesized by treatment with 1:1 $HNO_3$/$H_2SO_4$ in a closed vessel microwave for approximately 20 minutes, at about 120° C. and at atmospheric pressure (Ref. 31). It is noted that CNTs containing any suitable organic or an inorganic group (e.g., —COOH, —$NO_2$, amides, —$HSO_3$, polymers and biomolecules) may be utilized in accordance with the present disclosure.

Further derivatization such as, for example, amidation is also possible in the microwave reactor (Ref. 30). Once the CNTs were functionalized, they were sonicated in water, acetone or ethanol for a few minutes to form a substantially uniform dispersion (Refs. 30-31). The derivatized CNTs have been characterized by microscopy and spectroscopy (Refs. 30-32). The presence of some of these functional groups also improves the adhesion to the membrane material (Ref. 30).

In order to prepare the nanotube immobilized membrane ("NIM"), about a 10 cm long (about 600 μm ID) polypropylene hollow fiber membrane was clamped on one end, and the CNT dispersion was pumped into the lumen using a microsyringe pump. In exemplary embodiments, both SWNT and MWNT were used to fabricate the NIM. Under pressure, the CNTs were forced into and trapped within the pore structure of the polypropylene. This allowed the CNTs to become substantially immobilized within the membrane, while keeping the CNTs surface fully accessible to adsorption/desorption. It was found that the incorporation or immobilization of the CNTs was quite rugged, and the membrane did not lose the CNTs in spite of several washes with water and solvent.

Example 2

Another approach to synthesize a NIM was as follows: the base porous membrane was polypropylene hollow fiber membrane (Accurel Q3/2 polypropylene hollow fiber) with an average pore size of about 0.2 μm, inner diameter or I.D. of about 600 μm, and outer diameter or O.D. of about 1000 μm. The CNTs were immobilized within the membrane using a dispersion of functionalized CNTs in a polymer solution. Alternatively, the CNTs may be immobilized within the membrane using a dispersion of functionalized CNTs in a monomer solution, or any other suitable solution (e.g., methyl methacrylate, polyvinyl pyrrolidone, polyurethane, polyamide, polyethylene and polyethylene glycol solutions). In an exemplary embodiment, the polymer selected was PVDF (polyvinylidene fluoride). This was accomplished by first dissolving about 0.1 mg of PVDF in 15 ml of acetone and dispersing about 10 mg of MWNTs in PVDF/acetone solution by sonicating for 3-4 hours. Alternatively, the dispersion of CNTs may take a variety of forms, including, without limitation, aqueous, non-aqueous or monomeric dispersions.

The dispersion was injected into the lumen of about a 15 cm long hollow fiber membrane clamped on one end. MWNTs in various diameters were utilized to fabricate the NIM or nanocomposite immobilized membrane: (i) less than about 8 nm; (ii) about 20-40 nm; (iii) more than 50 nm; and (iv) MWNTs less than about 8 nm diameter containing carboxyl groups (—COOH). Under pressure, the PVDF/MWNTs nanocomposite was forced into and trapped within the pore structure of the polypropylene membrane.

These methods allowed immobilization or incorporation of the PVDF/MWNTs nanocomposite within the membrane, while keeping the CNT surface accessible to adsorption/desorption. Before use, the extractant (decane) was passed through the lumen several times in order to remove the excess CNTs inside the lumen. It was found that the incorporation was quite rugged, and the membrane did not lose the immobilized or incorporated CNTs in spite of several washes with water and solvent.

In exemplary embodiments, the dispersion (e.g., a dispersion of functionalized CNTs in a polymer solution) may be introduced into the substrate or membrane, and then polymerized (e.g., via in-situ polymerization) for immobilization of the CNTs within the substrate or membrane.

Example 3

Synthesis and Characterization of Functionalized CNTs

Approximately 20 mg of CNT was placed in a Teflon lined microwave vessel and about 50 ml of a 1:1 (v/v) $HNO_{3(aq)}$: $H_2SO_{4(aq)}$ mixture was added and the vessel sealed before being placed in a MARS microwave reactor (CEM, Matthews, N.C., USA) for 20 minutes microwave exposure with temperature set at 120° C. The reaction was as shown in FIG. 1, which depicts the reaction equation for acid functionalization of MWNTs.

Figure 2:
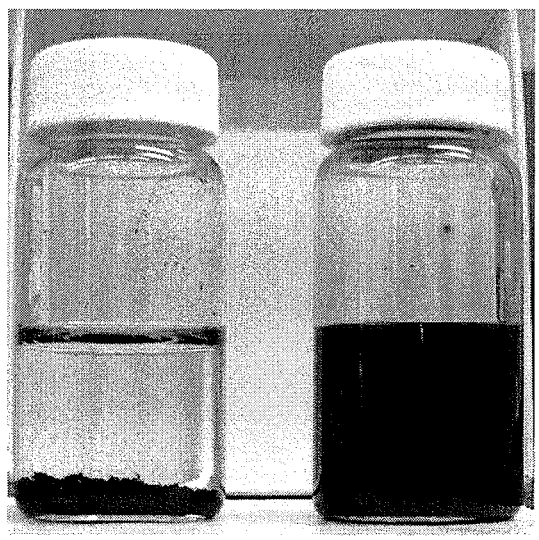
FIG. 2 illustrates the insolubility of pure CNTs compared to the dispersible nature of the functionalized CNTs according to the present disclosure: (a) pure CNTs were inert and precipitated out of water; (b) functionalization facilitated the dispersion of the CNTs in water after adequate sonication.

The mixture was then cooled, removed and filtered, and the solid allowed to air dry. The functionalized CNTs were then dispersed in distilled water by sonication. FIG. 2 illustrates the insolubility of pure CNT compared to the dispersible nature of the functionalized CNTs. More particularly, FIG. 2 illustrates that: (A) pure CNTs were inert and precipitated out of water; and (B) functionalization facilitated the dispersion of the CNTs in water after adequate sonication. Alternatively, the dispersion of CNTs may take a variety of forms, including, without limitation, non-aqueous, polymeric or monomeric dispersions.

Figure 3:
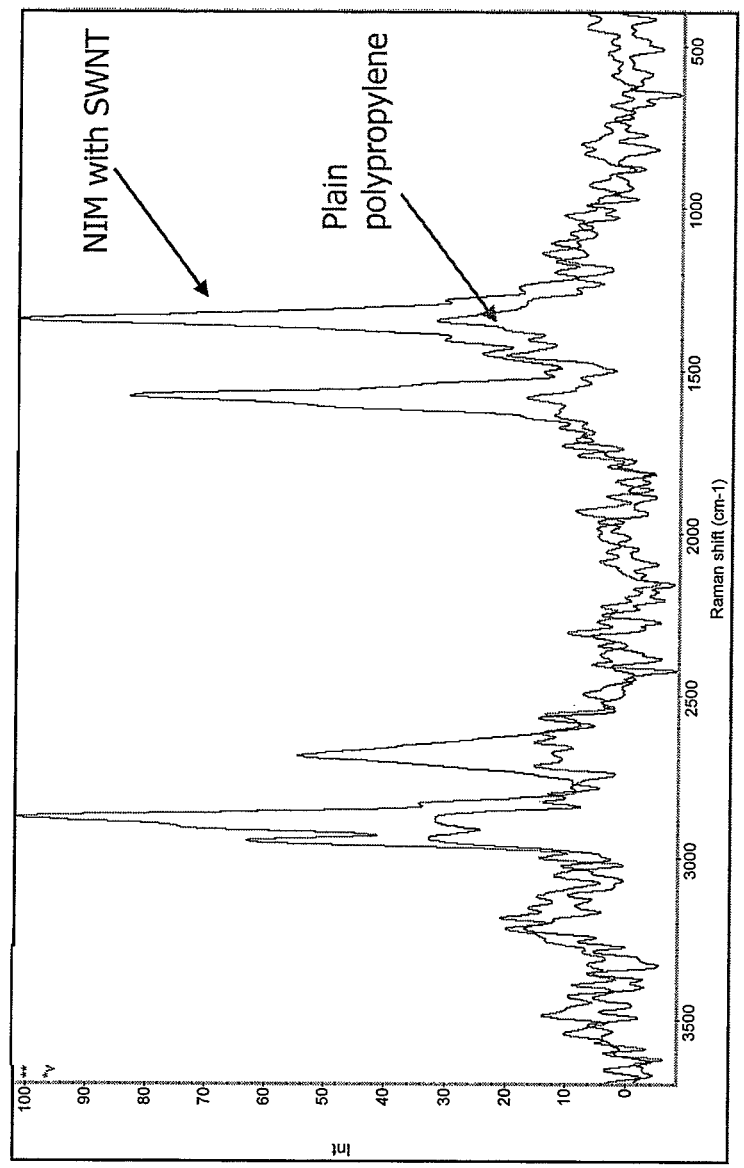
FIG. 3 illustrates the Raman spectra of pure polypropylene and a NIM, wherein the NIM spectra (taken at 780 nm with 1 mW power) shows the characteristic SWNT peaks in the high energy mode, and the pure polypropylene membrane spectra (taken at 532 nm with 100 mW power) has no CNT peaks.

The functionalized CNTs were characterized using Raman spectroscopy and Fourier-Transform Infra-Red (FT-IR) spectroscopy. FIG. 3 displays the Raman Spectra of the hollow fiber NIM showing the presence of functionalized SWNT, which was evidenced by the peak at around 1600 $cm^{-1}$ and the characteristic D-band from functionalization of the sidewalls. The spectra of the pure polypropylene did not show these lines. FIG. 3 illustrates that the NIM spectra (taken at 780 nm with 1 mW power) shows the characteristic SWNT peaks in the high energy mode and the pure or plain polypropylene membrane spectra (taken at 532 nm with 100 mW power) has no CNT peaks.

Figure 4:
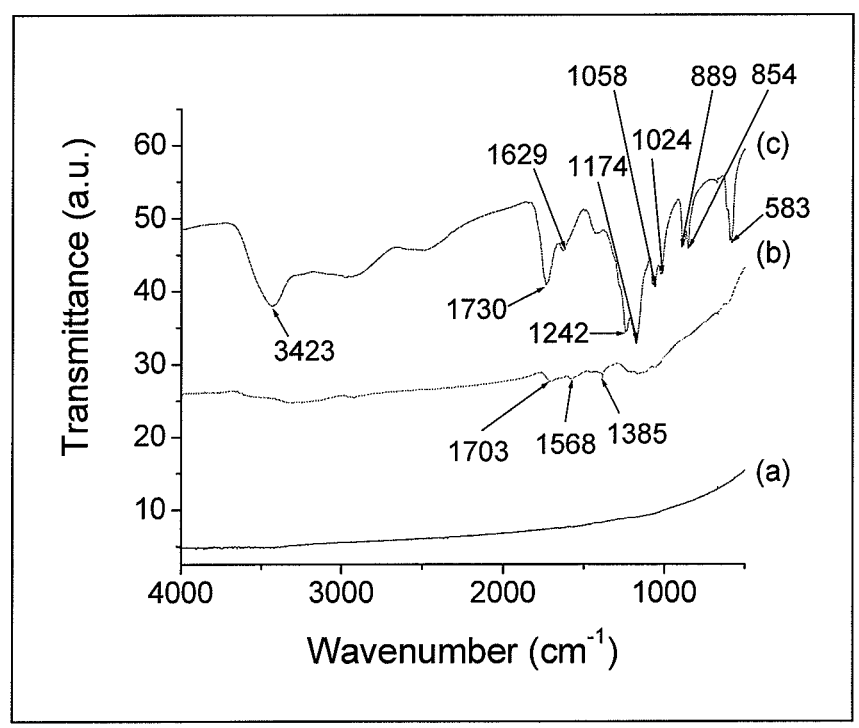
FIG. 4 depicts the FTIR spectra for: (a) original CNTs, (b) functionalized MWNTs and (c) functionalized SWNTs.

The FTIR spectra of pure CNTs and its functionalized analog are shown in FIG. 4. More particularly, FIG. 4 depicts the FTIR spectra for: (a) original CNTs, (b) functionalized MWNTs and (c) functionalized SWNTs. The pristine CNTs do not have any prominent feature in an IR spectrum. The acid treated SWNTs underwent significant functionalization via carboxylation and nitration as shown in FIG. 4(c). The MWNTs on the other hand showed lesser degree of derivatization with weaker absorption bands. The functionalities of interest are the —COOH formed by the oxidation of CNTs. The line at 1730 cm$^{-1}$ was assigned to the C=O stretching mode of the —COOH groups (where the carbon is from the CNT backbone), whereas the intense, broad line centered at 3423 cm$^{-1}$ was assigned to the —OH stretching mode of the —COOH group. The line at 1629 cm$^{-1}$ was assigned to the CNT C=C graphitic stretching mode that is infrared-activated by extensive sidewall functionalization. In FIG. 4(b), the line at 1730 cm$^{-1}$ was also assigned to the C=O stretching mode of the —COOH groups.

Figure 5:
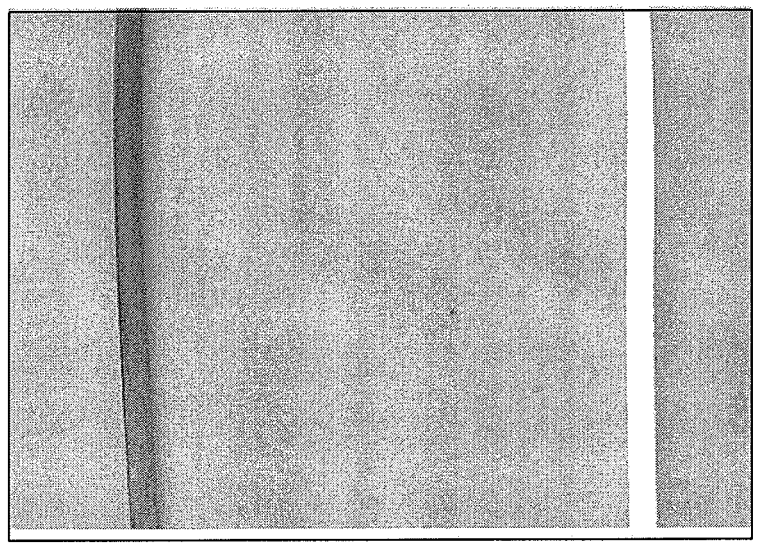
FIG. 5 is illustrates a photograph of: a) a NIM; and b) pure polypropylene.

The presence of the CNT in the polypropylene membrane was confirmed by visual inspection, Confocal Raman Spectroscopy (Thermo Electron Nicolet Almega XR Dispersive Raman Spectrometer with Olympus BX51 research-grade microscope) and Scanning Electron Microscopy (SEM, Model LEO 1530). FIGS. 5A (photograph of NIM) and 5B (photograph of pure polypropylene) depict the photograph of the original fiber and the NIM. The presence of the CNT led to the formation of a dark color as shown in FIG. 5A.

Figure 6:
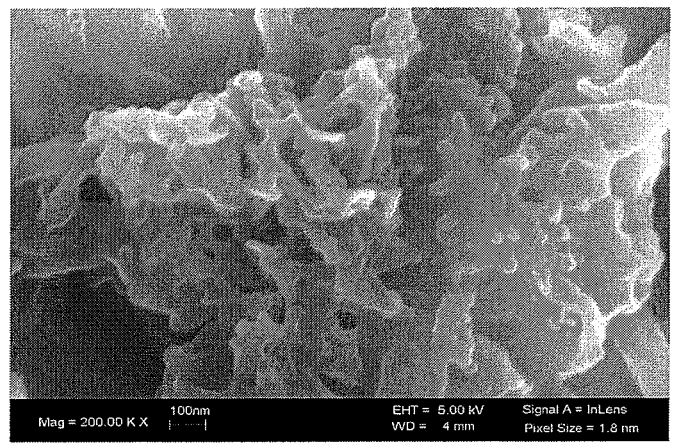
FIG. 6 depicts a SEM image of a polypropylene surface (×200)
Figure 7:
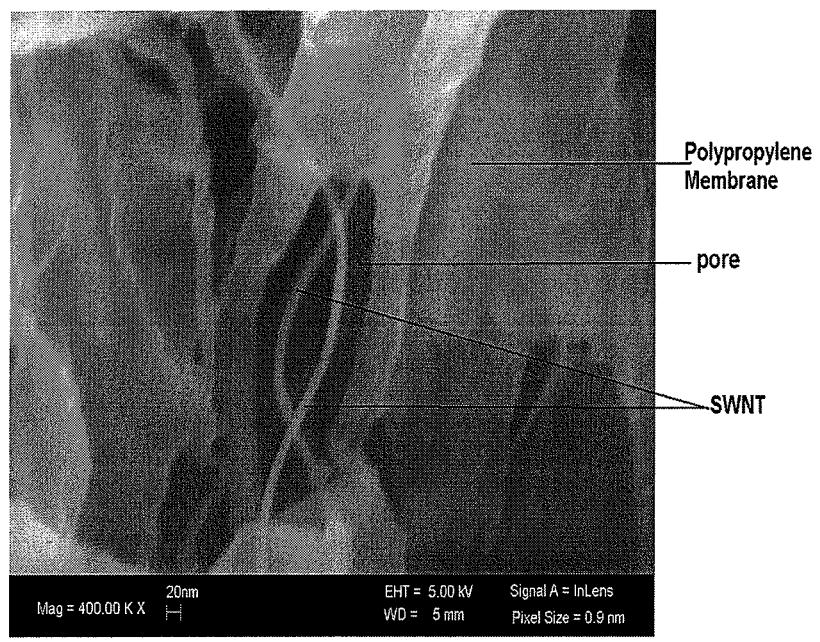
FIG. 7 depicts a SEM image of a NIM surface (×400)
Figure 8:
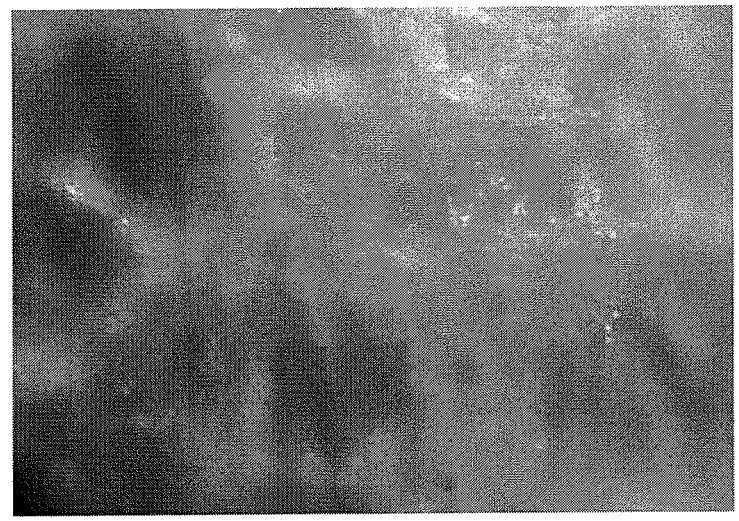
FIG. 8 is a Confocal Raman Microscope image of pure microporous polypropylene (×50)
Figure 9:
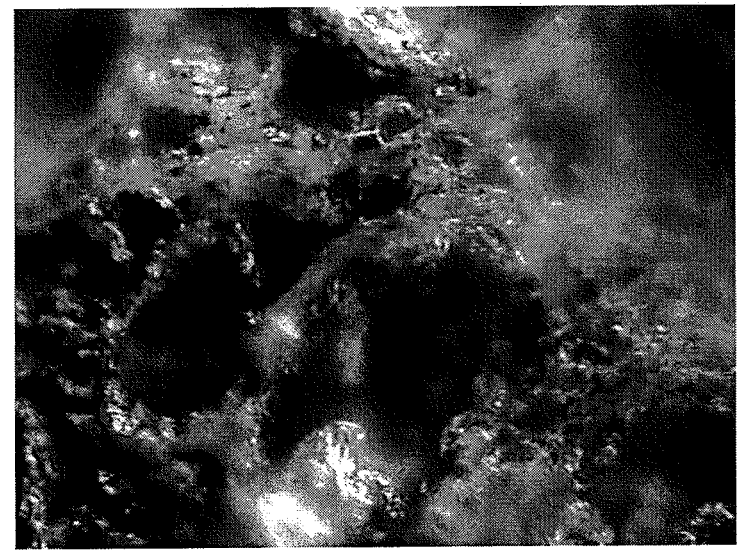
FIG. 9 is a Confocal Raman Microscope image of a NIM (×50)

The SEM image in FIG. 7 shows the presence of the CNTs as slender strands within the membrane pores, absent in the pure polypropylene membrane (FIG. 6). This was also confirmed by images from confocal Raman microscopy, which are presented in FIGS. 8 and 9. The dark patches of CNTs are distinctly visible in the NIM.

Example 4

Characterization of NIM Fabricated with PVDF-CNT Solution

Figure 10:
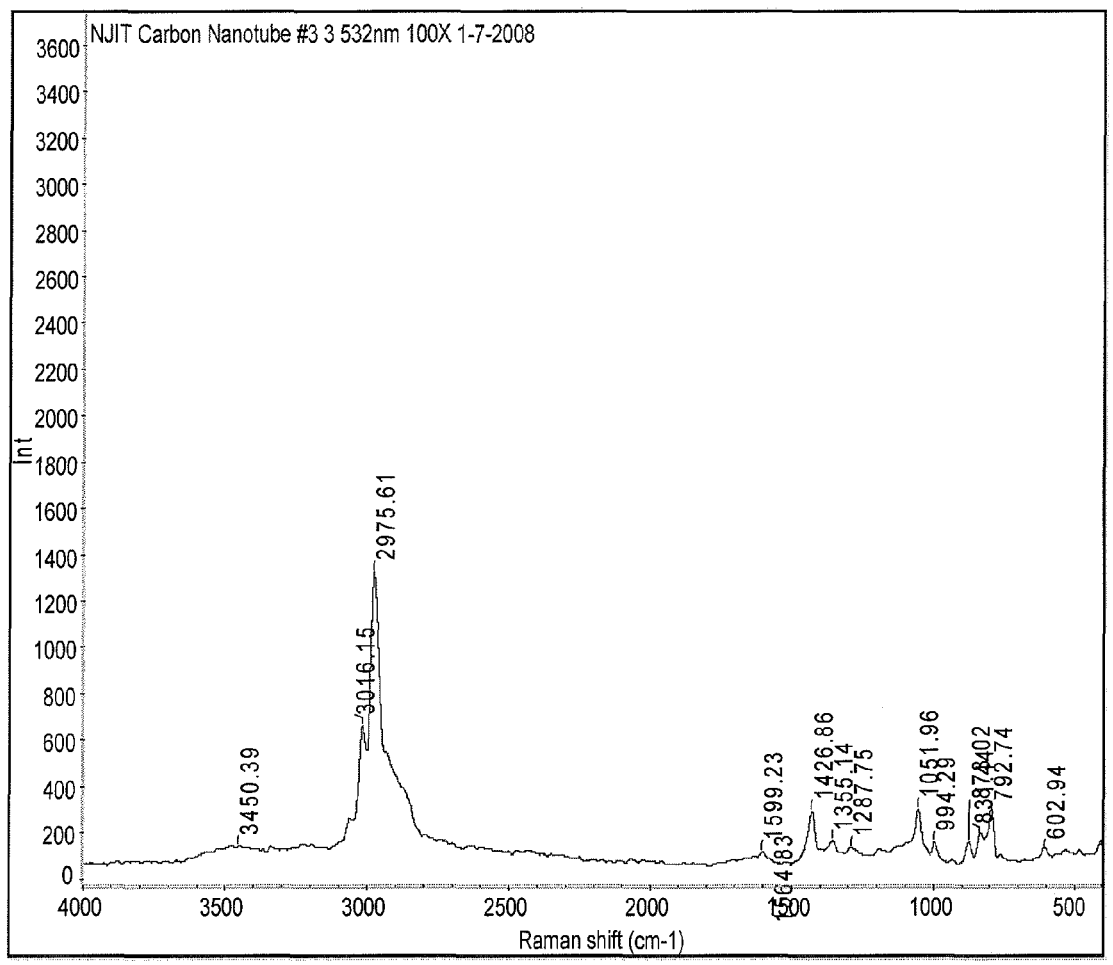
FIG. 10 shows the Raman spectra of the pristine PVDF.
Figure 11:
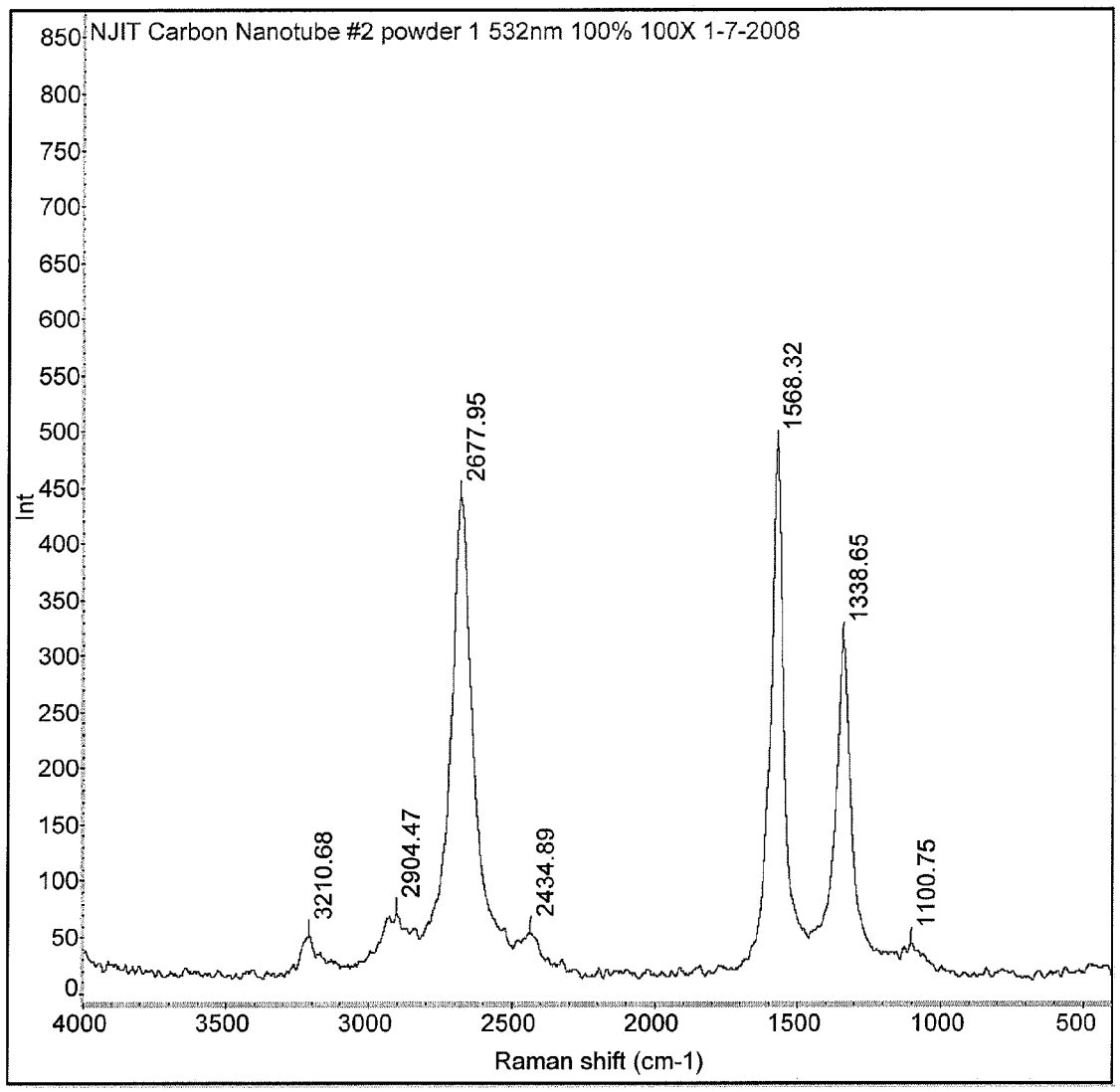
FIG. 11 shows the Raman spectra of pristine MWNTs.
Figure 12:
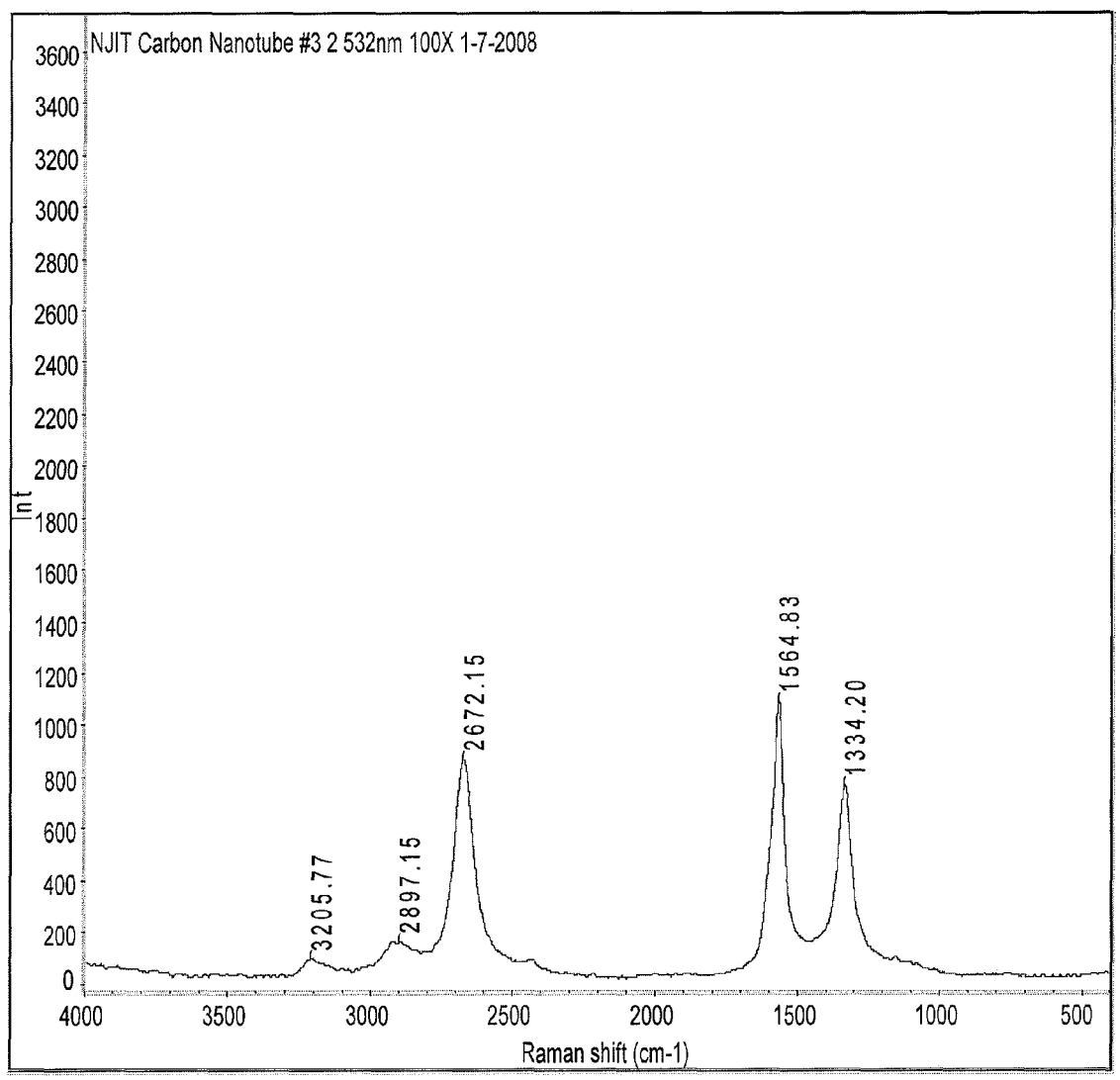
FIG. 12 shows the Raman spectra of the composite (e.g., PVDF/MWNTs [more than 50 nm diameter] composite)

In exemplary embodiments, the PVDF served as the binder for CNTs that facilitated the immobilization on the polypropylene pores. This was accomplished by percolating/injecting PVDF/CNT dispersion through the membrane. Uniform dispersion of the CNTs was important, and the CNTs needed to be well dispersed to accomplish uniform dispersion. The interaction between the PVDF and MWNT was studied by Raman spectroscopy. Generally, this interaction is reflected by a peak shift or peak width change. The measurement was taken at the excitation wavelength of 532 nm in the frequency range (wavenumber) of 400-4000 cm$^{-1}$. FIG. 10 shows the Raman spectra of the pristine PVDF, FIG. 11 shows the Raman spectra of MWNTs, and FIG. 12 shows the Raman spectra of the composite (e.g., PVDF/MWNTs [more than 50 nm diameter] composite). As shown in FIG. 10, the PVDF has a large peak at 2975 cm$^{-1}$ while there are three peaks located at 2677, 1568, and 1338 cm$^{-1}$ in pristine MWNTs (FIG. 11). The peak near 1338 cm$^{-1}$ is assigned to the D band which is related to disordered sp$^2$-hybridized carbon atoms of nanotubes. The peak near 1568 cm$^{-1}$ is the G band which is related to the graphite E$_{2g}$ symmetry of the interlayer mode. This mode reflects the structural integrity of sp$^2$-hybridized carbon atoms of nanotubes (Ref. 40). The second-order G' band appears at 2677 cm$^{-1}$. FIG. 12 shows Raman spectrum of the nanocomposite PVDF/MWNTs. Raman spectra showed some physical interaction between PVDF and MWNTs which clearly appeared by the frequency shift of all three peaks in MWNTs. Moreover, the intensity of the frequency at 2672 cm$^{-1}$ relative to the frequency at 1568 and 1338 cm$^{-1}$ is reduced by 26%. On the other hand, no new peaks were observed from the Raman spectra of PVDF/MWNTs nanocomposite which indicates that no new chemical bonds could be formed in the nanocomposite.

Figure 13:
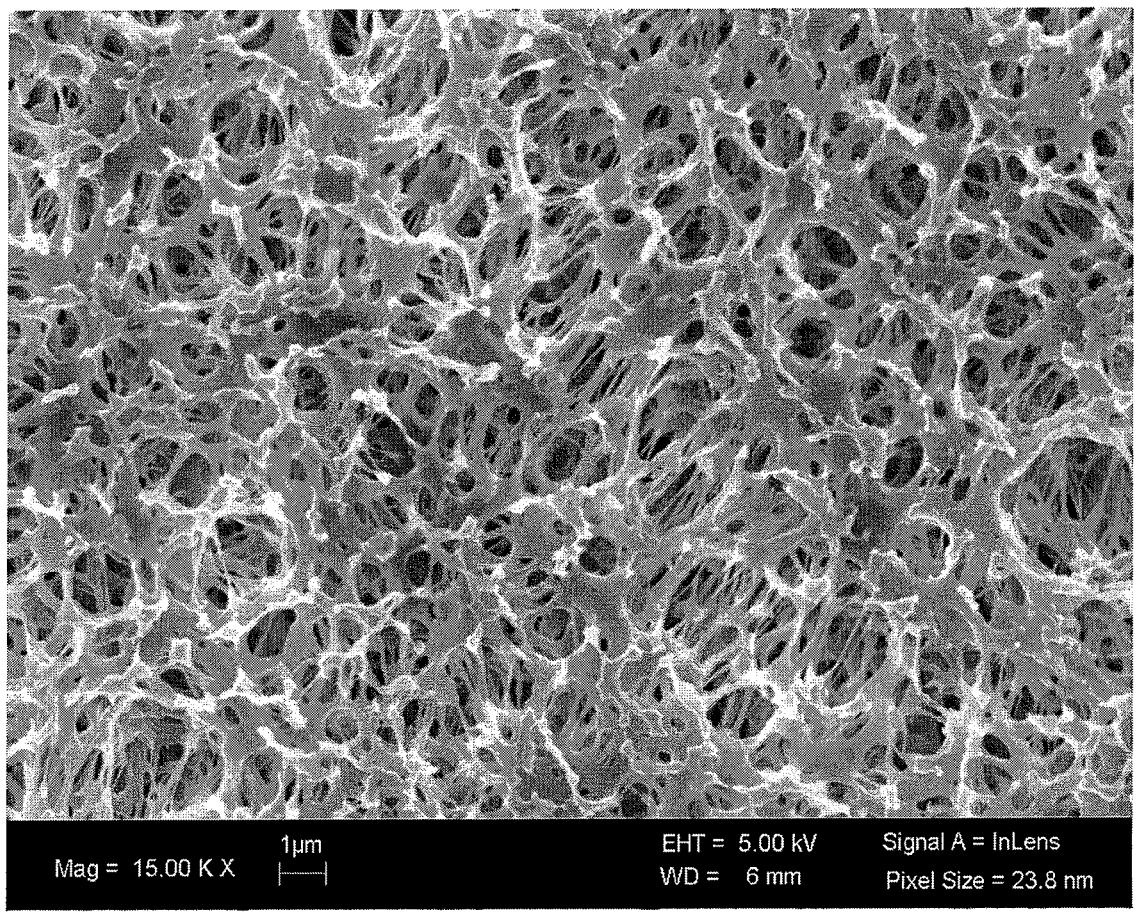
FIG. 13 depicts an SEM image of a plain polypropylene membrane.
Figure 14:
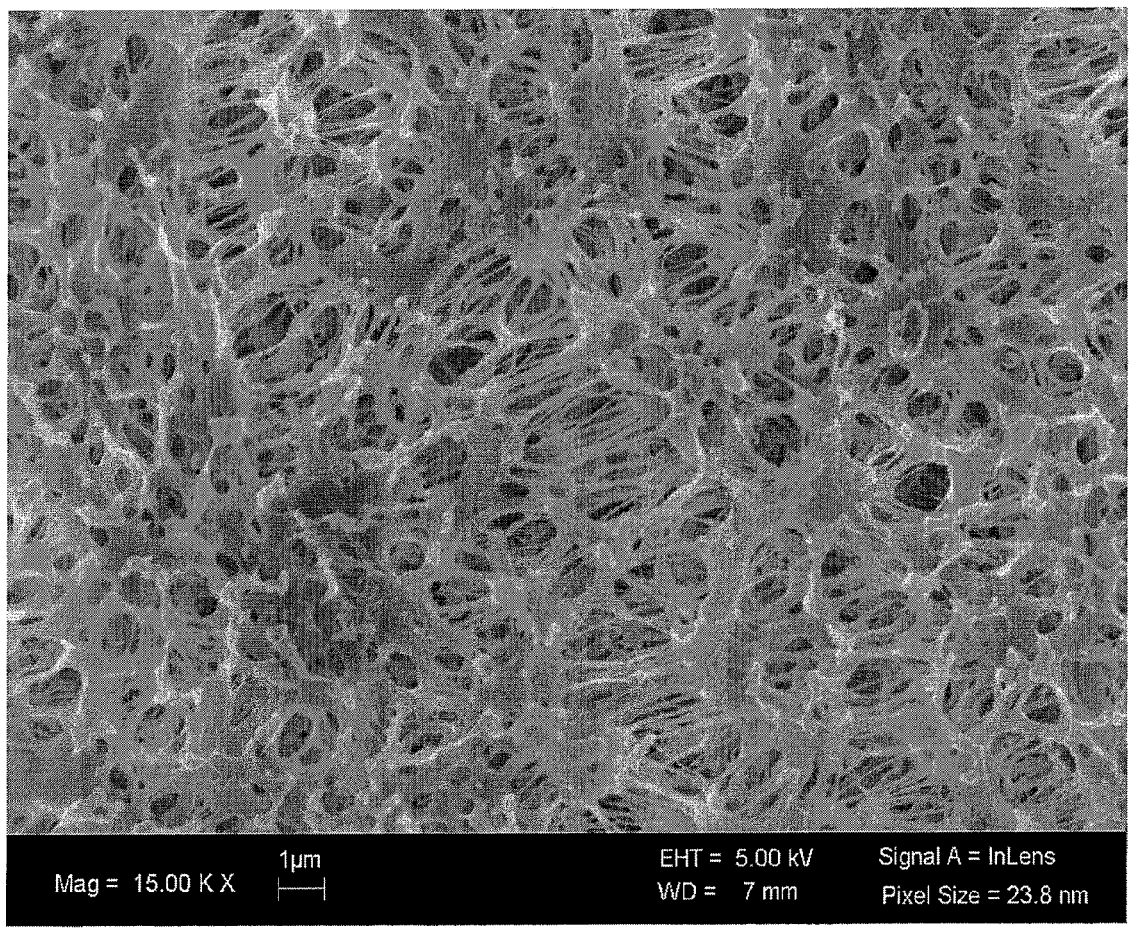
FIG. 14 depicts an SEM image of a membrane with PVDF.
Figure 15:
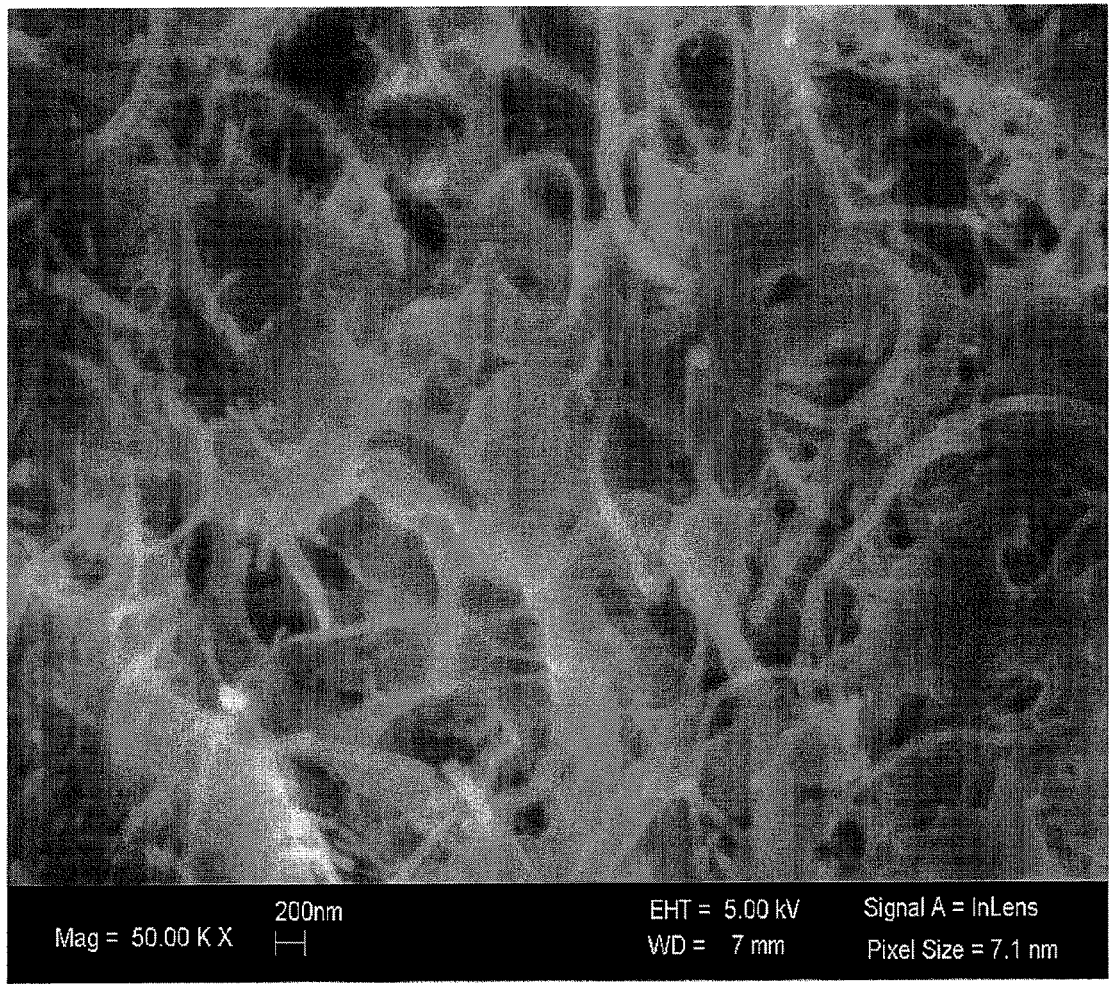
FIG. 15 depicts an SEM image of a membrane with PVDF/MWNTs (more than 50 nm diameter) composite.

In order to investigate the immobilized membrane synthesized using a PVDF-CNT mixture, SEM was used to characterize these membranes. The SEM images of a plain polypropylene membrane, a membrane with PVDF, and PVDF/MWNTs composite immobilized membrane surface are shown in FIGS. 13-15. More particularly, FIG. 13 depicts an SEM image of a plain polypropylene membrane, FIG. 14 depicts an SEM image of a membrane with PVDF, and FIG. 15 depicts an SEM image of a membrane with PVDF/MWNTs (more than 50 nm diameter) composite. No visible change on the membrane surface as a result of the insertion of PVDF could be detected (FIGS. 13 and 14). On the other hand, the PVDF/MWNTs composite were well positioned within the membrane pores as can be seen in FIG. 15.

Figure 16:
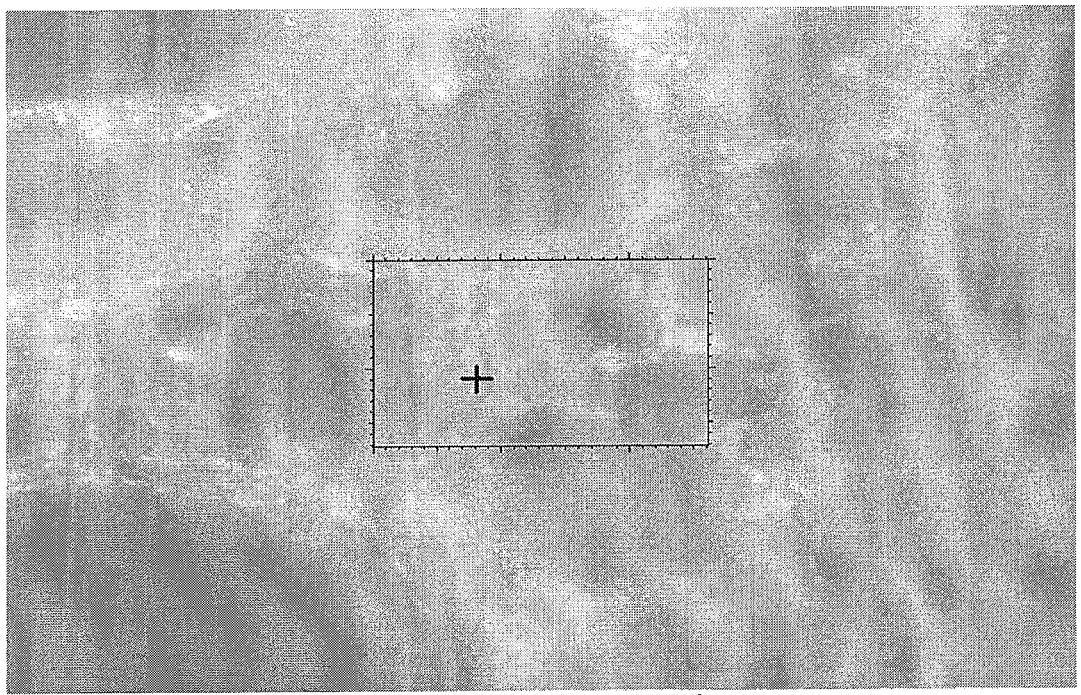
FIG. 16 depicts a Confocal Raman Microscope image of a plain polypropylene membrane.
Figure 17:
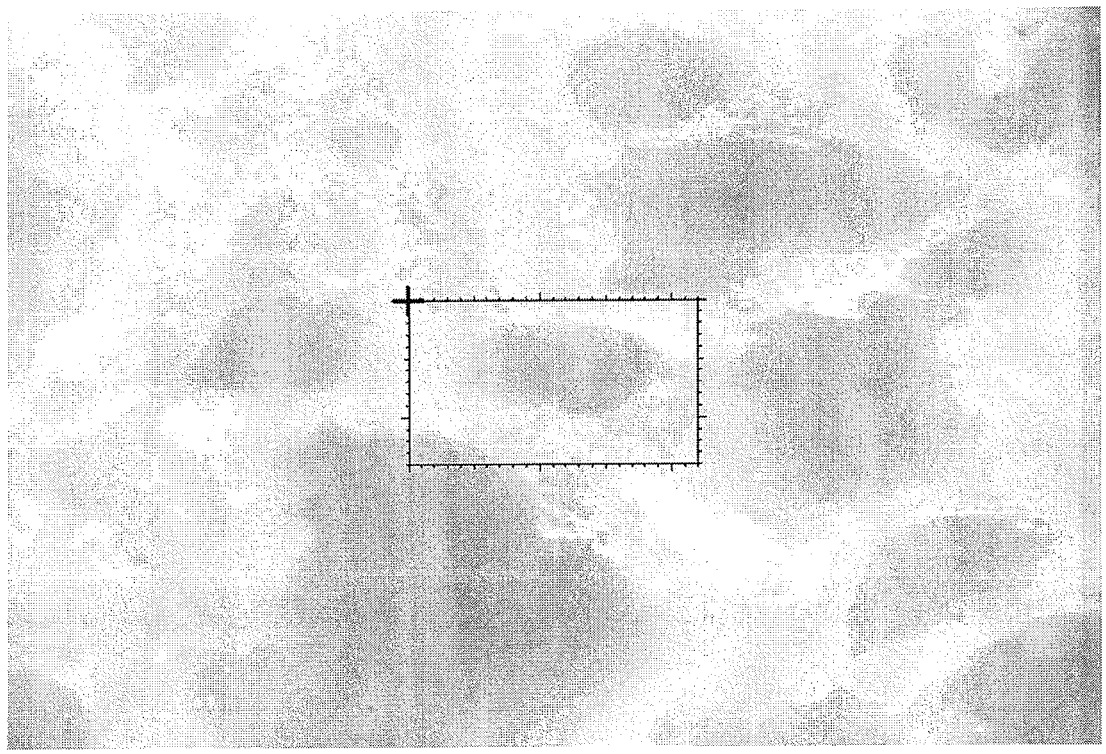
FIG. 17 depicts a Confocal Raman Microscope image of a membrane with PVDF.
Figure 18A:
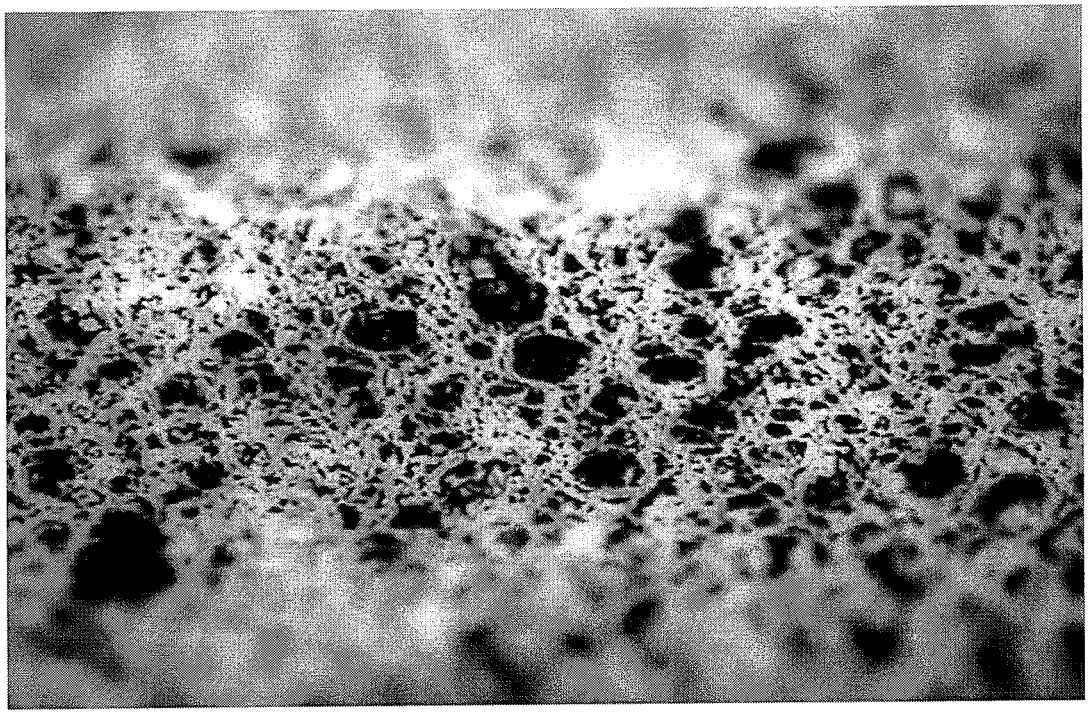
FIGS. 18A and 18B depict Confocal Raman Microscope images of a membrane with PVDF/MWNTs (more than 50 nm diameter) composite in low and high magnification, respectively.
Figure 18B:
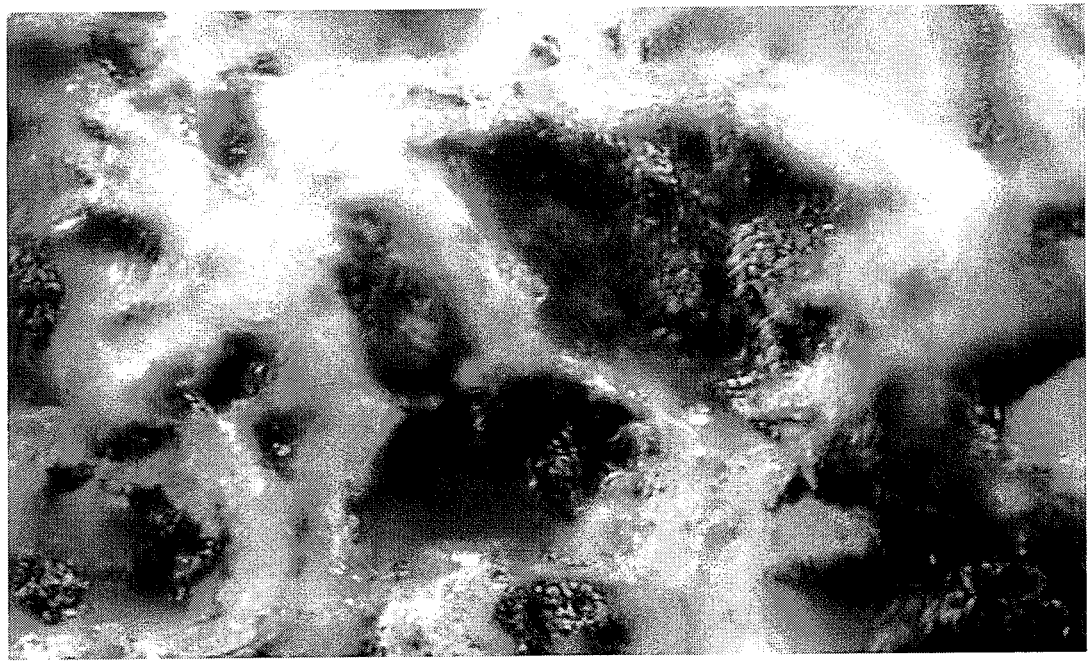

FIG. 16 depicts a Confocal Raman Microscope image of a plain polypropylene membrane. FIG. 17 depicts a Confocal Raman Microscope image of a membrane with PVDF. FIGS. 18 and 18B depict Confocal Raman Microscope images of a membrane with PVDF/MWNTs (more than 50 nm diameter) composite in low and high magnification, respectively. The Confocal Raman Microscopy was used to characterize the plain membrane surface, PVDF immobilized membrane surface, and also to confirm the presence of MWNTs within the membrane pores as shown in FIG. 18. It is noted that the presence of the nanocomposite led to the formation of a dark color on the membrane surface.

Example 5

Membrane Extraction

Figure 19:
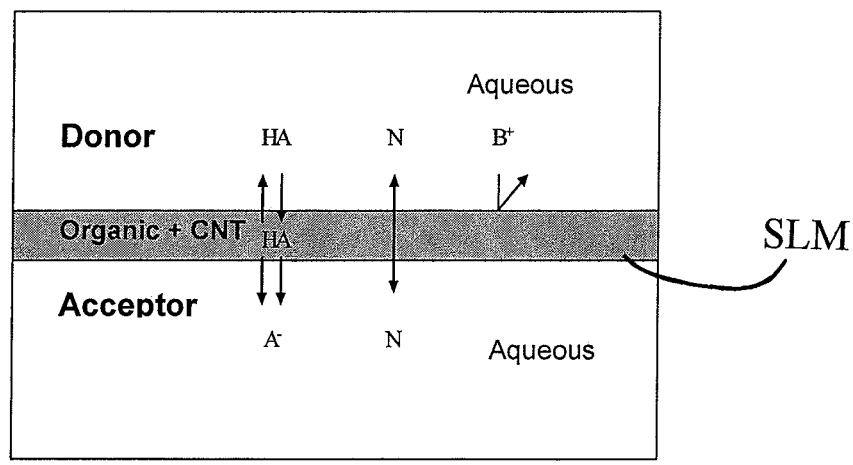
FIG. 19 illustrates the mechanism of micro-scale Supported Liquid Membrane Extraction (µ-SLME), wherein HA represents acid, N represents neutral molecules and B⁺ are bases, and wherein, in general, neutrals cannot be enriched and bases cannot traverse the membrane.

In exemplary embodiments, the effectiveness of CNT mediated membrane extraction was studied by utilizing two approaches: 1) micro-scale Liquid-Liquid Membrane Extraction (μ-LLME) and 2) micro-scale Supported Liquid Membrane Extraction (μ-SLME). The efficiency of these extractions is generally assessed in terms of the enrichment factor (EF), which is defined as the ratio of the concentration of the solute in extract to that in the donor phase. In general, μ-LLME is a two phase system where the solute is extracted from an aqueous solution into an organic extractant (Ref. 29). It is essentially a liquid-liquid extraction with the phases physically separated by a membrane and in contact only at the pores. On the other hand, μ-SLME is a three phase system as shown in FIG. 19, and is typically suitable for polar and ionic compounds such as organic acids and bases (Refs. 29, 33-36). It has been known to provide high selectivity and enrichment. Here, the liquid immobilized in the pores of a membrane functions as the membrane referred to as a supported liquid membrane (SLM). In general, its selectivity can be enhanced by using a carrier molecule with a high affinity for the solute. For the transport of organic acids, the pH on the donor side is maintained such that the solute is in an uncharged neutral form, and can be extracted into an organic SLM, thus crossing the water/membrane interface. On the other side of the membrane, pH is maintained at a level that keeps the solute charged, so it is unable to move back across the membrane.

Figure 20:
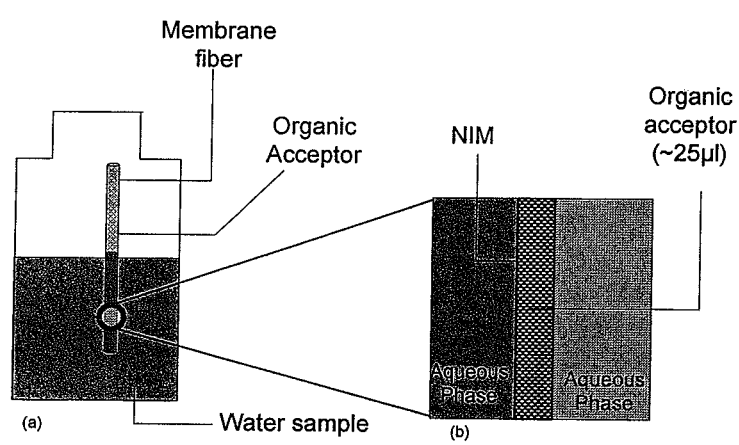
FIG. 20 depicts a schematic representation of µ-scale membrane extraction according to the present disclosure.

The operations of μ-LLME and μ-SLME are similar, the only substantial difference being the mechanism of solute transport. The extraction setup is shown in FIG. 20. In both cases, a few microliters of an extractant were injected into the lumen of the hollow fiber. The membrane fiber was then lowered into a sample solution and stirred at an optimized speed for a pre-determined period. Then the extract was removed from the lumen and analyzed using HPLC.

In exemplary embodiments, for toluene (Fisher-Scientific, NJ, USA) the extraction solvent was 1-octanaol (HPLC grade, Sigma Aldrich, Allentown, Pa., USA) while for naphthalene (Supelco Park, Pa., USA), decane (HPLC grade, Sigma Aldrich, Allentown, Pa.) was used as the extractant.

Once the NIM had been prepared, about 25 μL (microliters) of an organic solvent were injected into the membrane lumen. The starting membrane was a polypropylene hollow fiber with an I.D of about 600 μm, O.D of about 1000 μm and an average pore size of about 0.2 μm (Membrana, Wuppertal, Germany). The solvent filled membrane was then immersed into about 200 ml of a sample solution and held in place using microsyringes (Hamilton, Reno, Nev., USA), that could also be used to withdraw the extract. The sample was then stirred at about 80 rpm on a Corning PC-353 stirrer. Toluene extraction was carried out for 30 minutes, while naphthalene extraction was carried out for about 60 minutes. After the extraction, the extract was withdrawn and placed in HPLC vials (Agilent Technologies, DE, USA) for analysis with UV detection at 254 nm (Hewlett-Packard 1050 with Perkin Elmer 785A UV/Vis detector, Suplcco 150×4.6 mm, 5 micron column). The HPLC mobile phase was 65:35 (v/v) acetonitrile: DI water for isocratic elution at a flow rate of 1.5 ml/min. Data analysis was done using SRI Instruments Peak Simple version 3.29 software.

μ-SLME of trichloroacetic acid (TCAA) and tribromoacetic acid (TBAA) (Supleco Park, PA, USA) was achieved by acidifying the sample to pH of about 0.1 with concentrated sulphuric acid. Dihexyl ether was the organic extractant in the SLM and 0.01M NaOH was the acceptor. HPLC separation was achieved using 95% 15 mM $KH_2PO_4$ (ACS reagent grade, Sigma, St. Louis, Mo., USA): 5% acetonitrile (v/v) at a flow rate of 1 ml/min in an isocratic gradient with detection at 210 nm.

Figure 21:
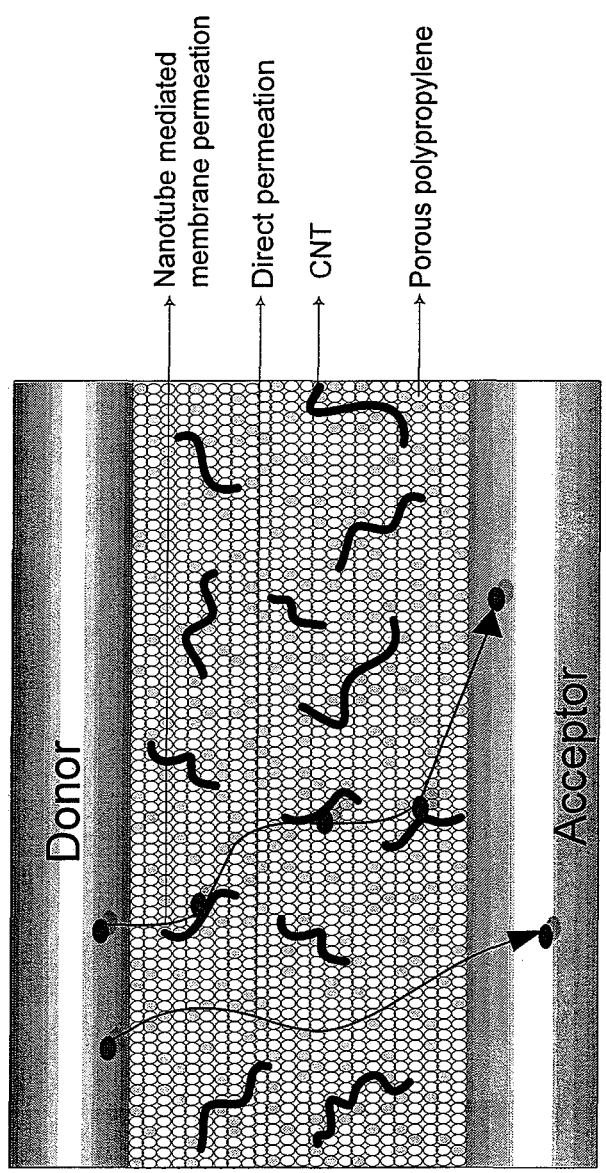
FIG. 21 is a schematic representation of NIM extraction according to the present disclosure, wherein the solute first adsorbs to the CNT and then it is desorbed by the organic extractant that fills the pores and lumen of the NIM.

In exemplary embodiments and in regards to NIMs, there were two extractants, the solvent and the CNT. The latter serves as a sorbent that increases the effective partition coefficient, or the number of solute molecules that can cross over from the donor to the membrane. The mechanism of transport across the CNT is shown in FIG. 21. The solutes first adsorb on the CNTs, and are then desorbed into the acceptor phase. Two considerations here are the high adsorption capacity of the CNTs and the efficient desorption from it (Refs, 22, 23), both being feasible because the sorption sites on a CNT are generally on the outer wall of the tubes that are easily accessible. Consequently, the mass transfer resistance here is significantly less than what is encountered in porous sorbents like activated charcoal and zeolites.

In exemplary embodiments and as discussed above, toluene and naphthalene were used to study the enrichment in μ-LLME. Extractions were carried out with plain hollow fibers and with NIMs containing both MWNTs and SWNTs. The results are presented in Table 1. Different solvents were tried for the extractions as well; 1-octanol was used as the extractant for toluene, while decane was used for naphthalene. Toluene extraction was done for 30 minutes and naphthalene for 60 minutes. For both solutes, nanotube mediated extraction yielded higher EF compared to plain polypropylene; the enhancement was between 44 and 231% (Table 1). The presence of CNTs increased the effective surface area, the overall partition coefficient, while the acceptor in contact with the CNTs readily desorbed the solutes. All these factors led to an overall enhancement in solute transport. In the case of naphthalene, where decane was used as the extractant, the presence of CNTs appeared to perform the additional task of stabilizing the liquid membrane. It has been reported that under similar conditions, within 60 minutes most of decane would have been lost from the hollow fiber leading to poor enrichment (Ref. 37). However, in the case of NIM, the solvent loss was minimal.

TABLE 1

Variation of EF with membrane material

| | Plain Membrane | NIM with MWNT | % Improvement | NIM with SWNT | % Improvement |
|---|---|---|---|---|---|
| μ-LLME | | | | | |
| Toluene | 3673 | 5281 | 44 | 5746 | 56 |
| Naphthalene | 221 | 731 | 231 | 446 | 102 |
| μ-SLME | | | | | |
| TCAA | 221 | 273 | 24 | 401 | 81 |
| BCAA | 381 | 1296 | 240 | 931 | 144 |

In exemplary embodiments, trichloroacetic acid (TCAA) and tribromoacetic acid (TBAA), two important disinfection by-products in water treatment were selected as the model solutes for μ-SLME. The extraction was achieved by acidifying the sample with concentrated sulphuric acid. Dihexyl ether was the organic extractant in SLM, and 0.01M NaOH was the acceptor. As in the case of μ-LLME, it was observed that nanotube mediated membrane extraction provided higher enrichment for all compounds with improvements of up to 240% over the polypropylene membrane (Table 1). This is also attributed to the enhanced partitioning of the uncharged acids in the CNTs prior to pre-concentration into the basic acceptor.

Example 6

Solvent Retention in Membranes

During membrane extraction, while the analytes flow into the extractant, the extractant sometimes has the tendency to flow out as well. Retaining the extractant in the membrane is generally an important issue. For example, the solvent can be lost through the membrane by diffusion and/or by solubilizing in water. The permeation of extractant is typically undesirable because it leads to mixing of the two phases, and some solutes may also be lost reducing membrane performance. In exemplary embodiments, the retention of a variety of solvents were tested by enclosing a few microliters of the solvent in the membrane lumen and following their out migration over time. In both the plain membrane and NIM, hexane, acetone, dichloromethane were completely lost within 5 min. Without being bound by any theory, this may be due to the fact that they are small molecules and have high diffusion coefficient through the membrane pores.

Figure 22:
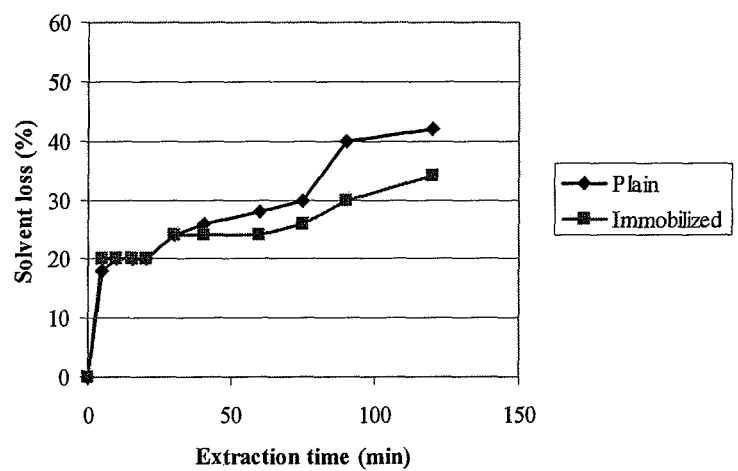
FIG. 22 depicts the effect of extraction time on solvent loss (n-decane loss) in a plain membrane versus a NIM.

The presence of the original MWNTs showed significantly higher levels of non-polar solvent retention compared to plain membranes and NIM with carboxyl-MWNT. On the other hand, polar solvents were retained higher in the plain membrane than NIM. FIG. 22 shows the solvent loss (n-decane loss) in a plain membrane through the pores, and improved solvent retention in NIM. More particularly, FIG. 22 depicts the effect of extraction time on solvent loss (n-decane loss) in a plain membrane versus a NIM. The reduction in solvent loss could be due to several factors such as the having pore surfaces decreased and also the hydrophobic interaction between the organic solvent molecules and CNTs. As shown in FIG. 22, the solvent retention was higher in the NIM after extraction for 30 minutes. At 90 minutes, 70% of decane was still retained in the NIM, while only 60% was retained in the plain membrane. As such, the loss of decane was reduced in the presence of the NIM.

The above examples have illustrated improved membranes or materials having CNTs introduced and/or immobilized therein, and improved methods for introducing and/or immobilizing CNTs in membranes or materials. For example, the present disclosure provides for improved systems and methods for fabricating nanotube immobilized membranes (NIMs) by incorporating or immobilizing functionalized CNTs in a porous polymeric membrane or material (e.g., in a porous polypropylene matrix). In exemplary embodiments, the functionalization of the CNTs allows the CNTs to be dispersed in water or solution for injection through the membrane. In addition, the functional groups may also assist in adhering the CNTs to the membrane (e.g., polypropylene) surface. The exemplary NIMs displayed enhanced enrichment (e.g., enhanced membrane extraction) in both μ-LLME and μ-SLME formats.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

REFERENCES

[1] W. Eykamp, in: R. D. Noble, S. A. Stern, Eds.; *Membrane Separations Technology: Principles and Application*, Elsevier Science B. V; Amsterdam, 1995; pp. 1.
[2] B. D. Freeman, *Macromolecules,* 32 (1999) 375.
[3] L. Robeson, *J. Membr. Sci.* 62 (1991) 165.
[4] S. Kim, T. W. Pechar, E. Marand, *Desalination,* 192 (2006) 330.
[5] Y. Xiao, K. Yu Wang, T. S. Chung, J. Tan, *Chem. Eng. Sci.* 61 (2006) 6228.
[6] T-S. Chung, L. Y. Jiang, Y. Li, S. Kulprathipanja, *Prog. Polym. Sci.* 32 (2007) 483.
[7] S. Husain, W. J. Koros, *J. Membr. Sci* 288 (2007) 195-207.
[8] L. Y. Jiang, T-S. Chung, R. Rajagopalan, *Carbon,* 45 (2000) 166.
[9] T. C. Bowen, R. G. Meier, L. M. Vane, *J. Membr. Sci.* 278 (2007) 117.
[10] S. B. Teli, G. S. Gokavi, M. Sairam, T. M. Aminabhavi, *Colloid Surface A.* 301 (2007) 55.
[11] S. Z. Borneman, M. Wessling, *J. Membr. Sci.* 280 (2006) 406.
[12] M. E. Avramescu, Z. Borneman, M. Wessling, *J. Chromatogr. A.* 1006 (2003) 171.
[13] Y. Li, T. S. Chang, Z. Huang, S. Kulprathipanja, *J. Memb. Sci.* 277 (2006) 28.
[14] Y. Zhang, H Li, J. Lin, R. Li, X. Liang, *Desalination.* 192 (2006) 198.
[15] M. Anson, J. Marchese, E. Garis, N. Ochoa, C. Pagliero, *J. Membr. Sci.* 243 (2004) 19.
[16] M. Souram, M. B. Patil, R. S. Veerapur, S. A. Patil, T. M. Ammabhavi, *J. Membr. Sci.* 281 (2006) 95.
[17] V. Popov, *Mat. Sci. Eng. R.* 43 (2004) 61.
[18] E. Ballesteros, M. Gallego, M. Valcá rcel, *J. Chromatogr., A.* 869 (2000) 101.
[19] J. R. Baena, M. Gallego, M. Valcá rcel, *Analyst.* 125 (2000) 1495.
[20] J. R. Baena, M. Gallego, M. Valcá rcel, *Anal. Chem.* 74 (2002) 1519.
[21] C. Saridara, R. Brukh, S. Mitra, *J. Sep. Sci.* 29 (2006) 446.
[22] M. Karwa, S. Mitra, *Anal. Chem.* 78 (2006) 2064.
[23] C. Saridara, S. Mitra, *Anal. Chem.* 77 (2005) 7094.
[24] C. Saridara, R. Brukh, Z. Iqbal, S. Mitra, *Anal. Chem.* 77 (2005) 1183.
[25] J. K. Holt, H. Gyu Park, Y. Wang, M. Stadermann, A. B. Artyukhin, C. P. Griporopolous, A. Noy, O. Bakajin, *Science,* 312 (2006) 1034.
[26] G. Hummer, J. C. Rasaiah, J. P. Noworyta, *Nature,* 414 (2001) 188.
[27] B. J. Hinds, N. Chopra, T. Rantell, R. Andrews, V. Gavalas, L. Bachas, *Science,* 303 (2004) 62.
[28] M. Majumder, N. Chopra, R. Andrews, B. J. Hinds, *Nature,* 438 (2005) 44.
[29] K. Hylton, S. Mitra, *J. Chromatogr., A* 1152 (2007) 199.
[30] Y. Wang, Z. Iqbal, S. Mitra, *Carbon.* 43 (2005) 1015.
[31] Y. Wang, Z. Iqbal, S. V. Malhotra, *Chem. Phys. Lett.* 402 (2005) 96.
[32] Y. Wang, Z. Iqbal, S. Mitra, *Carbon.* 44 (2006) 2804.
[33] P. Dzygiel, P. Wierczorck, *J. Chromatogr., A.* 889 (2000) 93.
[34] M. Knutsson, G. Nilve, L. Mathiasson, J. A. Jonsson, *J. Chromatogr., A.* 754 (1996) 197.
[35] M. Luque, E. Luque-Perez, A. Rios, M. Valcarcel, *Anal. Chim. Acta.* 410 (2000) 127.
[36] N. Megersa, J. A. Jonsson, *Analyst.* 123 (1998) 225.
[37] K. Hylton, S. Mitra, *J. Chromatogr., A.* 1154 (2007) 60.

What is claimed is:

1. A method for fabricating a nanotube immobilized membrane comprising:
providing a hollow substrate, the substrate having a lumen and a pore structure;
providing a plurality of non-soluble carbon nanotubes and at least one functionalizing reactant, the at least one functionalizing reactant including an acidic solution;
delivering the plurality of non-soluble carbon nanotubes and the at least one functionalizing reactant to a microwave vessel;
closing and sealing the microwave vessel;
positioning the closed and sealed microwave vessel in a microwave reactor;
subjecting the plurality of non-soluble carbon nanotubes and the at least one functionalizing reactant to microwave conditions via the microwave reactor at about 120° C. so that after the plurality of carbon nanotubes and the at least one functionalizing reactant are subject to the microwave conditions while in the closed and sealed microwave vessel, the plurality of carbon nanotubes are: (i) microwave-functionalized, and (ii) soluble in a solvent;
removing the plurality of microwave-functionalized and soluble carbon nanotubes from the microwave vessel;
dispersing at least a portion of the plurality of microwave-functionalized and soluble carbon nanotubes in a monomer or polymer solution to form a uniform dispersion of microwave-functionalized carbon nanotubes;

introducing the uniform dispersion of microwave-functionalized carbon nanotubes into the pore structure of the substrate;
polymerizing the uniform dispersion of microwave-functionalized carbon nanotubes so that after the uniform dispersion of microwave-functionalized carbon nanotubes is introduced into the pore structure of the hollow substrate and polymerized, at least one of the microwave-functionalized carbon nanotubes of the uniform dispersion is immobilized within the pore structure of the hollow substrate, and the at least one immobilized carbon nanotube is not encapsulated in the polymerized polymer so that the surface of the at least one immobilized carbon nanotube is available for active solute transport or exchange.

2. The method of claim 1, wherein the uniform dispersion of microwave-functionalized carbon nanotubes is selected from the group consisting of aqueous, non-aqueous, polymeric and monomeric dispersions.

3. The method of claim 1, wherein at least one carbon nanotube of the plurality of carbon nanotubes is covalently microwave-functionalized via the microwave conditions.

4. The method of claim 1, wherein at least one of the microwave-functionalized carbon nanotubes contains the functional group selected from the group consisting of —COOH, —$NO_2$, amides, —$HSO_3$, polymers and biomolecules.

5. The method of claim 1, wherein the substrate is selected from the group consisting of polymeric, ceramic, metallic, composite, symmetric and asymmetric substrates.

6. The method of claim 1, wherein the solubility of the plurality of microwave-functionalized carbon nanotubes is more than 10 mg of microwave-functionalized nanotubes per milliliter of de-ionized water and ethanol under ambient conditions.

7. The method of claim 1, wherein the plurality of carbon nanotubes includes single wall carbon nanotubes (SWNTs) and multiwall carbon nanotubes (MWNTs).

8. The method of claim 1, wherein the uniform dispersion of microwave-functionalized carbon nanotubes is injected or pumped into the pore structure of the substrate under pressure.

9. The method of claim 1 further comprising the steps of:
injecting an extractant, after the uniform dispersion of microwave-functionalized carbon nanotubes is introduced into the pore structure of the hollow substrate and polymerized, into the lumen of the hollow substrate;
positioning at least a portion of the extractant containing substrate into a sample solution for a pre-determined period of time; and
removing the extractant from the lumen of the substrate after the pre-determined period of time.

10. A method for fabricating a nanotube immobilized membrane comprising:
providing a hollow substrate, the hollow substrate having a lumen and a pore structure;
providing a plurality of non-soluble carbon nanotubes and at least one functionalizing reactant, the at least one functionalizing reactant including an acidic solution;
delivering the plurality of non-soluble carbon nanotubes and the at least one functionalizing reactant to a microwave vessel;
closing and sealing the microwave vessel;
positioning the closed and sealed microwave vessel in a microwave reactor;
subjecting the plurality of non-soluble carbon nanotubes and the at least one functionalizing reactant to microwave conditions via the microwave reactor at about 120° C. for about 20 minutes so that after the plurality of carbon nanotubes and the at least one functionalizing reactant are subject to the microwave conditions while in the closed and sealed microwave vessel, the plurality of carbon nanotubes are: (i) microwave-functionalized, and (ii) soluble in a solvent;
cooling, removing and filtering the plurality of microwave-functionalized and soluble carbon nanotubes from the microwave vessel;
dispersing at least a portion of the plurality of microwave-functionalized and soluble carbon nanotubes in a monomer or polymer solution to form a uniform dispersion of microwave-functionalized carbon nanotubes;
introducing the uniform dispersion of microwave-functionalized carbon nanotubes into the pore structure of the hollow substrate;
polymerizing the uniform dispersion of microwave-functionalized carbon nanotubes, so that after the uniform dispersion of microwave-functionalized carbon nanotubes is introduced into the pore structure of the hollow substrate and polymerized, at least one of the microwave-functionalized carbon nanotubes of the uniform dispersion is immobilized within the pore structure of the hollow substrate, and the at least one immobilized carbon nanotube is not encapsulated in the polymerized polymer so that the surface of the at least one immobilized carbon nanotube is available for active solute transport or exchange.

11. The method of claim 10, wherein at least one carbon nanotube of the plurality of carbon nanotubes is covalently microwave-functionalized via the microwave conditions.

12. The method of claim 10, wherein at least one of the microwave-functionalized carbon nanotubes contains the functional group selected from the group consisting of —COOH, —$NO_2$, amides, —$HSO_3$, polymers and biomolecules.

13. The method of claim 10, wherein the hollow substrate is selected from the group consisting of polymeric, ceramic, metallic, composite, symmetric and asymmetric substrates.

14. The method of claim 10, wherein the solubility of the plurality of microwave-functionalized carbon nanotubes is more than 10 mg of microwave-functionalized nanotubes per milliliter of de-ionized water and ethanol under ambient conditions.

15. The method of claim 10 further comprising the steps of:
injecting an extractant, after the uniform dispersion of microwave-functionalized carbon nanotubes is introduced into the pore structure of the hollow substrate and polymerized, into the lumen of the hollow substrate;
positioning at least a portion of the extractant containing substrate into a sample solution for a pre-determined period of time; and
removing the extractant from the lumen of the substrate after the pre-determined period of time.

16. The method of claim 10, wherein the dispersion is injected or pumped into the pore structure of the hollow substrate under pressure.

17. The method of claim 10, wherein the monomer or polymer solution is selected from the group consisting of polyvinylidene fluoride (PVDF), methyl methacrylate, polyvinyl pyrrolidone, polyurethane, polyamide, polyethylene and polyethylene glycol solutions.

18. A method for fabricating and utilizing a nanotube immobilized membrane comprising:
providing a hollow substrate, the hollow substrate having a lumen and a pore structure;

providing a plurality of non-soluble carbon nanotubes and at least one functionalizing reactant, the at least one functionalizing reactant including an acidic solution;

delivering the plurality of non-soluble carbon nanotubes and the at least one functionalizing reactant to a lined microwave vessel;

closing and sealing the microwave vessel;

positioning the closed and sealed microwave vessel in a microwave reactor;

subjecting the plurality of non-soluble carbon nanotubes and the at least one functionalizing reactant to microwave conditions via the microwave reactor at about 120° C. for about 20 minutes and at atmospheric pressure so that after the plurality of carbon nanotubes and the at least one functionalizing reactant are subject to the microwave conditions while in the closed and sealed microwave vessel, the plurality of carbon nanotubes are: (i) microwave-functionalized, and (ii) soluble in a solvent;

cooling, removing and filtering the plurality of microwave-functionalized and soluble carbon nanotubes from the microwave vessel, the solubility of the plurality of microwave-functionalized carbon nanotubes is more than 10 mg of microwave-functionalized nanotubes per milliliter of de-ionized water and ethanol under ambient conditions;

dispersing at least a portion of the plurality of microwave-functionalized and soluble carbon nanotubes in a monomer or polymer solution to form a uniform dispersion of microwave-functionalized carbon nanotubes;

injecting or pumping the uniform dispersion of microwave-functionalized carbon nanotubes into the pore structure of the hollow substrate under pressure;

polymerizing the uniform dispersion of microwave-functionalized carbon nanotubes, so that after the uniform dispersion of microwave-functionalized carbon nanotubes is injected or pumped into the pore structure of the hollow substrate and polymerized, at least one of the microwave-functionalized carbon nanotubes of the uniform dispersion is immobilized within the pore structure of the hollow substrate, and the at least one immobilized carbon nanotube is not encapsulated in the polymerized polymer so that the surface of the at least one immobilized carbon nanotube is available for active solute transport or exchange;

injecting an extractant, after the uniform dispersion of microwave-functionalized carbon nanotubes is injected or pumped into the pore structure of the hollow substrate and polymerized, into the lumen of the hollow substrate;

positioning at least a portion of the extractant containing substrate into a sample solution for a pre-determined period of time; and removing the extractant from the lumen of the substrate after the pre-determined period of time.

\* \* \* \* \*